(12) United States Patent
Gillam

(10) Patent No.: US 6,742,164 B1
(45) Date of Patent: May 25, 2004

(54) METHOD, SYSTEM, AND PROGRAM FOR GENERATING A DETERMINISTIC TABLE TO DETERMINE BOUNDARIES BETWEEN CHARACTERS

(75) Inventor: Richard Theodore Gillam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,329

(22) Filed: Sep. 1, 1999

(51) Int. Cl.[7] .............................................. G06F 17/00
(52) U.S. Cl. ....................................... 715/531; 715/521
(58) Field of Search ................................. 707/521, 530, 707/531, 532; 382/229, 230, 231; 704/9

(56) References Cited

U.S. PATENT DOCUMENTS

| | | | | |
|---|---|---|---|---|
| 4,864,502 A | * | 9/1989 | Kucera et al. .................. | 704/8 |
| 4,887,212 A | | 12/1989 | Zamora et al. | |
| 4,933,883 A | | 6/1990 | Pennebaker et al. | |
| 4,965,763 A | | 10/1990 | Zamora | |
| 4,991,094 A | | 2/1991 | Fagan et al. | |
| 5,095,432 A | * | 3/1992 | Reed .............................. | 704/9 |
| 5,099,440 A | | 3/1992 | Pennebaker et al. | |
| 5,560,037 A | * | 9/1996 | Kaplan ......................... | 707/533 |
| 5,610,812 A | | 3/1997 | Schabes et al. | |
| 5,625,554 A | * | 4/1997 | Cutting et al. ............... | 707/100 |
| 5,689,585 A | | 11/1997 | Bloomberg et al. | |
| 5,721,939 A | * | 2/1998 | Kaplan .......................... | 704/9 |
| 5,737,621 A | * | 4/1998 | Kaplan et al. ............... | 707/531 |
| 5,774,834 A | * | 6/1998 | Visser .......................... | 704/10 |
| 5,796,752 A | * | 8/1998 | Sun et al. ..................... | 714/738 |
| 5,801,687 A | * | 9/1998 | Peterson et al. ......... | 715/500.1 |
| 5,832,530 A | | 11/1998 | Paknad et al. | |
| 5,832,531 A | | 11/1998 | Ayers | |
| 5,835,892 A | | 11/1998 | Kanno | |
| 5,862,251 A | * | 1/1999 | Al-Karmi et al. ............. | 706/52 |
| 5,892,842 A | | 4/1999 | Bloomberg | |
| 6,424,983 B1 | * | 7/2002 | Schabes et al. ............. | 715/533 |
| 6,523,172 B1 | * | 2/2003 | Martinez-Guerra et al. . | 717/143 |

FOREIGN PATENT DOCUMENTS

| | | |
|---|---|---|
| EP | 0266001 | 5/1995 |
| EP | 0701223 | 5/1997 |
| EP | 0702322 | 6/1997 |
| WO | 9800794 | 1/1998 |
| WO | 9808169 | 2/1998 |

* cited by examiner

*Primary Examiner*—Sanjiv Shah
(74) *Attorney, Agent, or Firm*—David W. Victor; Konrad, Raynes & Victor LLP

(57) ABSTRACT

Disclosed is a system, method, and program for generating a data structure for use by a computer in determining a location of boundaries in text. The data structure is initialized and at least one regular expression is processed. Input characters in the at least one regular expression are then processed to determine at least one transition to at least one state. A determination is then made as to whether one input character would cause a non-deterministic transition. Additional states are added to the data structure to transform the non-deterministic transition to a deterministic transition.

36 Claims, 25 Drawing Sheets

FIG. 2
(Prior Art)

|   | ltr | digit | ' | . | $ | % |
|---|-----|-------|---|---|---|---|
| 1 | 2 | 4 |   |   | 7 |   |
| 2 | 2 | 4 | 3 |   |   |   |
| 3 | 2 |   |   |   |   |   |
| 4 | 2 | 4 |   | 5 |   | 6 |
| 5 |   | 4 |   |   |   |   |
| 6 |   |   |   |   |   |   |
| 7 |   | 4 |   |   |   |   |

FIG. 4

| Regular Expression | Description | First match in sample text (ignoring zero-length matches) |
|---|---|---|
| a | Matches the letter a | cbabbaababaaabaababba |
| [ab] | Matches either the letter a or the letter b | cbabbaababaaabaababba |
| ab | Matches an a followed by a b | cbabbaababaaabaababba |
| [a-c] | Matches the letters a, b, and c | cbabbaababaaabaababba |
| [a-c^b] | Matches the letters a and c ("a through c, but not b") | cbabbaababaaabaababba |
| a* | Matches zero or more a's in a row | cbabbaababaaabaababba |
| [bc]* | Matches a run of zero or more characters containing only b's and c's | cbabbaababaaabaababba |
| aaa* | Matches a run of two or more a's | cbabbaababaaabaababba |
| a*b | Matches zero or more a's follwed by a b | cbabbaababaaabaababba |
| aa*b | Matches one or more a's followed by a b | cbabbaababaaabaababba |
| ab*a | Matches zero or more b's flanked on either side by an a | cbabbaababaaabaababba |
| a{b}a | Matches two a's in a row, or two a's with a single b between them | cbabbaababaaabaababba |
| a{ba}a | Matches two a's in a row, or the sequence "abaa" | cbabbaababaaabaababba |
| a{b{a}}a | Matches "aa", "aba", or "abaa" | cbabbaababaaabaababba |
| {a}a{b} | Matches a single a, two a's in a row, an a followed by a b, or two a's followed by a b | cbabbaababaaabaababba |
| (ba) | Matches a b followed by an a (the parentheses have no effect) | cbabbaababaaabaababba |
| (ba)* | Matches a sequence of alternating b's and a's. The sequence must begin with a b and end with an a | cbabbaababaaabaababba |
| (baa*)* | Matches a sequence of a's and b's that starts with b, always has at least one a, and never has two b's in a row | cbabbaababaaabaababba |
| a(ba)* | Matches a sequence of alternating b's and a's starting and ending with a | cbabbaababaaabaababba |
| {a}(ba)* | Matches a sequence of alternating b's and a's that may start with either a or b but must finish with a | cbabbaababaaabaababba |
| {a}(ba*){b} | Matches a sequence of alternating b's and a's that may begin and end with either letter (this pattern can also match a single a or b) | cbabbaababaaabaababba |
| a[ab]a | Matches either "aaa" or "aba" | cbabbaababaaabaababba |
| a(a|b)a | Matches either "aaa" or "aba" (equivalent to a[ab]a) | cbabbaababaaabaababba |
| a(a|bb)a | Matches either "aaa" or "abba" | cbabbaababaaabaababba |
| a(a|bb)*a | Matches a sequence of a's that may contain, but not begin or end with, runs of an even number of b's | cbabbaababaaabaababba |
| (a{bb})*a | Matches a sequence of a's that may contain, but not begin or end with, pairs of b's | cbabbaababaaabaababba |

FIG. 6a

| Description | Value of C | Contents of L |
|---|---|---|
| Parse "[a-k]" to get a value for C. | { a, b, c, d, e, f, g, h, i, j, k } | (empty) |
| There are no elements in L, so just append C to the end. | { a, b, c, d, e, f, g, h, i, j, k } | { a, b, c, d, e, f, g, h, i, j, k } |
| Parse "[f-j]" to get a value for C. | { f, g, h, i, j } | { a, b, c, d, e, f, g, h, i, j, k } |
| Calculate the intersection of C and the first element in L. Append the result to the end of L. | { f, g, h, i, j } | { a, b, c, d, e, f, g, h, i, j, k } <br> { f, g, h, i, j } |
| Subtract this new set from both C and the current element of L. | { } | { a, b, c, d, e, k } <br> { f, g, h, i, j } |
| C is now empty, so we can go on and parse "[d-g]" to get a new value for C. | { d, e, f, g } | { a, b, c, d, e, k } <br> { f, g, h, i, j } |
| Calculate the intersection of C and the first element of L. Append the result to the end of L. | { d, e, f, g } | { a, b, c, d, e, k } <br> { f, g, h, i, j } <br> { d, e } |
| Subtract this new set from both C and the current element of L. | { f, g } | { a, b, c, k } <br> { f, g, h, i, j } <br> { d, e } |
| Now compare C against the second element of L. Append the intersection of the two sets to the end of L. | { f, g } | { a, b, c, k } <br> { f, g, h, i, j } <br> { d, e } <br> { f, g } |
| Subtract this new entry from both C and the second element of L. | { } | { a, b, c, k } <br> { h, i, j } <br> { d, e } <br> { f, g } |
| C is empty, so we parse "[f-j]" to get a new value for C. | { f, g, h, i, j } | { a, b, c, k } <br> { h, i, j } <br> { d, e } <br> { f, g } |
| Find the intersection of C with the first element of L. They don't intersect, so find the intersection of C and the second element of L. The intersection here is equal to the second element of L, so we don't add a new entry to the bottom of L. | { f, g, h, i, j } | { a, b, c, k } <br> { h, i, j } <br> { d, e } <br> { f, g } |
| Subtract the intersection from C, but not from the second element of L. (We didn't create a new category this time around.) | {f, g} | { a, b, c, k } <br> { h, i, j } <br> { d, e } <br> { f, g } |
| Find the intersection of C and the third element of L. They don't intersect, so find the intersection of C and the fourth element of L. This is equal to the fourth element of L itself, so we don't add a new category to the end of L. | {f, g} | { a, b, c, k } <br> { h, i, j } <br> { d, e } <br> { f, g } |
| But we still subtract this intersection from C. [Note what has happened here: we've seen "[f-j]" once before, so the second appearance of this expression has no effect on the result.] | { } | { a, b, c, k } <br> { h, i, j } <br> { d, e } <br> { f, g } |
| C is empty, so we parse "a" to get a new value for C. | { a } | { a, b, c, k } <br> { h, i, j } <br> { d, e } <br> { f, g } |

FIG. 6b

| | | |
|---|---|---|
| Find the intersection of C and the first element of L. Append the result to the end of L. | { a } | { a, b, c, k }<br>{ h, i, j }<br>{ d, e }<br>{ f, g }<br>{ a } |
| Subtract this new set from both C and the first element of L. | { } | { b, c, k }<br>{ h, i, j }<br>{ d, e }<br>{ f, g }<br>{ a } |
| C is empty again, so we parse "[j-o^k]" to get a new value for C. | { j, l, m, n, o } | { b, c, k }<br>{ h, i, j }<br>{ d, e }<br>{ f, g }<br>{ a } |
| Find the intersection of C and the first element of L. They don't intersect, so find the intersection of C and the second element of L and append it to the end of L. | { j, l, m, n, o } | { b, c, k }<br>{ h, i, j }<br>{ d, e }<br>{ f, g }<br>{ a }<br>{ j } |
| Subtract the new set from both C and the second element of L. | { l, m, n, o } | { b, c, k }<br>{ h, i }<br>{ d, e }<br>{ f, g }<br>{ a }<br>{ j } |
| Find the intersection of C and the third element of L. The intersection is empty, so find the intersection of C and the fourth element of L. This is also empty, as are the intersections of C and the last two elements of L. Take no action. | { l, m, n, o } | { b, c, k }<br>{ h, i }<br>{ d, e }<br>{ f, g }<br>{ a }<br>{ j } |
| We've reached the end of L, and C is not empty. Append C to the end of L. | { l, m, n, o } | { b, c, k }<br>{ h, i }<br>{ d, e }<br>{ f, g }<br>{ a }<br>{ j }<br>{ l, m, n, o } |
| We've parsed all the expressions that appear in the rule list, so we're done. L now contains a list of sets showing exactly which characters are in each category. The state transition table will now have the same number of columns are there are entries in L, plus one additional column for all the characters that aren't explicitly mentioned in the rule set. We have to make another pass through the expressions to map each to one or more category numbers. For example, "[f-j]" is equivalent to categories 2, 4, and 6. | | { b, c, k }<br>{ h, i }<br>{ d, e }<br>{ f, g }<br>{ a }<br>{ j }<br>{ l, m, n, o } |

FIG. 12

| Description | Decision point list | State table |
|---|---|---|
| Start with a table with one empty row and a decision point list containing just that row's row number. | 1 | a b c<br>1 - - - |
| Read "a" from the input. Add a new row to the end of the table. | 1 | a b c<br>1 - - -<br>2 - - - |
| Update every row in the decision point list to point to the new row in the appropriate column. Then clear the decision point list and put the new row's row number on it. | 2 | a b c<br>1 2 - -<br>2 - - - |
| Read "b" from the input. Add a new row to the end of the table. | 2 | a b c<br>1 2 - -<br>2 - - -<br>3 - - - |
| Point each row in the decision list to the new row. Clear the decision point list and replace it with the new row's row number. | 3 | a b c<br>1 2 - -<br>2 - 3 -<br>3 - - - |
| Read "c" from the input. Add a new row to the table. | 3 | a b c<br>1 2 - -<br>2 - 3 -<br>3 - - -<br>4 - - - |
| Update every row in the decision point list to point to the new row. Clear the decision point list and add the new row's row number. | 4 | a b c<br>1 2 - -<br>2 - 3 -<br>3 - - 4<br>4 - - - |
| There are no more characters in the input. Mark every row in the decision point list as an accepting state. | 4 | a b c<br>1 2 - -<br>2 - 3 -<br>3 - - 4<br>4 - - - * |

FIG. 13

| Description | Decision point list | State table |
|---|---|---|
| This is the state of the table at the end of "abc". We reset the decision point to row 1 again. | 1 | a b c<br>1 2 - -<br>2 - 3 -<br>3 - - 4<br>4 - - - * |
| Read "b" from the input. Add a new row to the table. | 1 | a b c<br>1 2 - -<br>2 - 3 -<br>3 - - 4<br>4 - - - *<br>5 - - - |
| Point the rows in the decision point list to the new row. Clear the decision point list and set it equal to the new row's row number. | 5 | a b c<br>1 2 5 -<br>2 - 3 -<br>3 - - 4<br>4 - - - *<br>5 - - - |
| Read "c" from the input. Add a new row to the table. | 5 | a b c<br>1 2 5 -<br>2 - 3 -<br>3 - - 4<br>4 - - - *<br>5 - - -<br>6 - - - |
| Point the rows in the decision point list to the new row. Clear the decision point list and set it equal to the new row's row number. | 6 | a b c<br>1 2 5 -<br>2 - 3 -<br>3 - - 4<br>4 - - - *<br>5 - - 6<br>6 - - - |
| Read "a" from the input. Add a new row to the table. | 6 | a b c<br>1 2 5 -<br>2 - 3 -<br>3 - - 4<br>4 - - - *<br>5 - - 6<br>6 - - -<br>7 - - - |
| Point the rows in the decision point list to the new row. Clear the decision point list and update it to be the row number of the new row. | 7 | a b c<br>1 2 5 -<br>2 - 3 -<br>3 - - 4<br>4 - - - *<br>5 - - 6<br>6 7 - -<br>7 - - - |
| We've exhausted the input mark any rows still in the decision point list as accepting states. | 7 | a b c<br>1 2 5 -<br>2 - 3 -<br>3 - - 4<br>4 - - - *<br>5 - - 6<br>6 7 - -<br>7 - - - * |
| Eliminate duplicate rows from the table and fix up all the references. (In this case, rows 4 and 7 are identical, so we eliminate row 7 and update row 6 to point to row 4.) | N/A | a b c<br>1 2 5 -<br>2 - 3 -<br>3 - - 4<br>4 - - - *<br>5 - - 6<br>6 4 - - |

FIG. 14a

| Description | Decision point list | State table |
|---|---|---|
| This is the state of the table at the end of "abc". We reset the decision point to row 1 again. | 1 | a b c<br>1 2 - -<br>2 - 3 -<br>3 - - 4<br>4 - - - * |
| Read "a" from the input. Add a new row to the table. | 1 | a b c<br>1 2 - -<br>2 - 3 -<br>3 - - 4<br>4 - - - *<br>5 - - - |
| Try to write the new row's row number into the "a" column of row 1 (the current contents of the decision point list) and update the decision point list to point to the new row. (There's a bit of juggling that must occur to make sure this step and the next step happen in the correct order.) | 5 | a b c<br>1 ! - -<br>2 - 3 -<br>3 - - 4<br>4 - - - *<br>5 - - - |
| We can't write 5 into the "a" column of row 1 without stomping on the 2 that's already there and losing data. Instead, create *another* new row and append it to the table. | 5 | a b c<br>1 ! - -<br>2 - 3 -<br>3 - - 4<br>4 - - - *<br>5 - - -<br>6 - - - |
| Copy the contents of row 2 (the row the "a" cell of column 1 originally referred to) into the new row. | 5 | a b c<br>1 ! - -<br>2 - 3 -<br>3 - - 4<br>4 - - - *<br>5 - - -<br>6 - 3 - |
| Merge the contents of row 5 (the new row we were trying to add) into row 6. This causes no change because row 5 is empty. | 5 | a b c<br>1 ! - -<br>2 - 3 -<br>3 - - 4<br>4 - - - *<br>5 - - -<br>6 - 3 - |
| Now set the "a" cell in row 1 to point to the new row. Row 5 was already in the decision point list, so add the new row to the list as well. | 5 6 | a b c<br>1 6 - -<br>2 - 3 -<br>3 - - 4<br>4 - - - *<br>5 - - -<br>6 - 3 - |
| Now read "c" from the input and add a new row to the table. | 5 6 | a b c<br>1 6 - -<br>2 - 3 -<br>3 - - 4<br>4 - - - *<br>5 - - -<br>6 - 3 -<br>7 - - - |

FIG. 14b

| Description | | Table |
|---|---|---|
| Update rows 5 and 6 (the rows in the decision point list) to point to the new row. Then clear the decision point list and set it equal to the new row's row number | 7 | a b c<br>1 6 - -<br>2 - 3 -<br>3 - - 4<br>4 - - - *<br>5 - - 7<br>6 - 3 7<br>7 - - - |
| Read "b" from the input and add a new row to the table. | 7 | a b c<br>1 6 - -<br>2 - 3 -<br>3 - - 4<br>4 - - - *<br>5 - - 7<br>6 - 3 7<br>7 - - -<br>8 - - - |
| Update row 7 (the only row in the decision point list) to point to the new row. Clear the decision point list and set it equal to the new row's row number. | 8 | a b c<br>1 6 - -<br>2 - 3 -<br>3 - - 4<br>4 - - - *<br>5 - - 7<br>6 - 3 7<br>7 - 8 -<br>8 - - - |
| We've exhausted the input text. Mark every row listed in the decision point list as an accepting state. | 8 | a b c<br>1 6 - -<br>2 - 3 -<br>3 - - 4<br>4 - - - *<br>5 - - 7<br>6 - 3 7<br>7 - 8 -<br>8 - - - * |
| Remove duplicate and unreferenced rows and clean up the references. Row 7 is identical to row 4, so it's removed and everything that pointed to it is updated to point to row 4. Rows 2 and 5 are no longer being referenced from the other rows, so they're removed and everything's renumbered. | N/A | a b c<br>1 5 - -<br>2 - - 3<br>3 - - - *<br>4 - 2 5<br>5 - 3 - |

FIG. 15

| Description | Decision point stack | State table |
|---|---|---|
| Start with a table with one empty row and a decision point list containing just that row's row number. | 1 | a b c<br>1 - - - |
| Read "a" from the input. It's a literal character, so add a new row to the end of the table. Then update the rows in the decision point list to point to it and replace the decision point list with the new row's row number. | 2 | a b c<br>1 2 - -<br>2 - - - |
| Read "b" from the input. "b" is followed by "*", so duplicate the decision point list and push the duplicate onto the stack. | 2<br>2 | a b c<br>1 2 - -<br>2 - - - |
| Now add a new row, point the rows in the decision point list at it, and replace the decision point list with the new row's row number. | 3<br>2 | a b c<br>1 2 - -<br>2 - 3 -<br>3 - - - |
| Read "*" from the input. Set the current state (the most-recently-added one) to loop back on itself. | 3<br>2 | a b c<br>1 2 - -<br>2 - 3 -<br>3 - 3 - |
| Now pop the top two entries off the decision point stack, merge them, and push the result back onto the stack as the new decision point list. | 3 2 | a b c<br>1 2 - -<br>2 - 3 -<br>3 - 3 - |
| Read "c" from the input. Add a new row to the table, update the rows in the decision point list to point to it, and replace the decision point list with the new row's row number. | 4 | a b c<br>1 2 - -<br>2 - 3 4<br>3 - 3 4<br>4 - - - |
| We've exhausted the input, so any rows left on the decision point list are marked as accepting states. | 4 | a b c<br>1 2 - -<br>2 - 3 4<br>3 - 3 4<br>4 - - - * |
| Remove duplicate and unreferenced rows from the table and fix up the references. Here, rows 2 and 3 are duplicates, so row 3 is removed and row 4 is renumbered. | N/A | a b c<br>1 2 - -<br>2 - 2 3<br>3 - - - * |

FIG. 16a

| Description | Decision point stack | State table |
|---|---|---|
| Start with a table with one empty row and a decision point list containing just that row's row number. | 1 | a b c<br>1 - - - |
| Read "a" from the input. It's a literal character, so add a new row to the end of the table. | 1 | a b c<br>1 - - -<br>2 - - - |
| Update every row in the decision point list to point to the new row in the appropriate column. Then clear the decision point list and put the new row's row number on it. | 2 | a b c<br>1 2 - -<br>2 - - - |
| Read "{" from the input. It's an opening brace, so duplicate the decision point list and push it onto the stack. | 2<br>2 | a b c<br>1 2 - -<br>2 - - - |
| Read "b" from the input. It's a literal character, so add a new row to the table. | 2<br>2 | a b c<br>1 2 - -<br>2 - - -<br>3 - - - |
| Update the rows in the decision point list to point to the new row, and clear the decision point list (which is just the top entry in the stack) and replace it with the new row's row number. | 3<br>2 | a b c<br>1 2 - -<br>2 - 3 -<br>3 - - - |
| Read "{" from the input. It's an opening brace, so duplicate the decision point list and push the copy onto the stack again. | 3<br>3<br>2 | a b c<br>1 2 - -<br>2 - 3 -<br>3 - - - |
| Read "c" from the input. Add a new row, point every row in the decision point list to it (again, the decision point list is just the top entry in the stack), clear the decision point list, and set the decision point list to be the row number of the new row. | 4<br>3<br>2 | a b c<br>1 2 - -<br>2 - 3 -<br>3 - - 4<br>4 - - - |
| Read "b" from the input. Add a new row, point every row in the decision point list to it, and replace the decision point list with the row number of the new row. | 5<br>3<br>2 | a b c<br>1 2 - -<br>2 - 3 -<br>3 - - 4<br>4 - 5 -<br>5 - - - |
| Read "}" from the input. It's a closing brace, so pop the top two entries off the stack, find their union, and push the result back onto the stack (it's our new decision point list). | 5 3<br>2 | a b c<br>1 2 - -<br>2 - 3 -<br>3 - - 4<br>4 - 5 -<br>5 - - - |
| Read the second "}" from the input. Again, pop the top two entries off the stack, find their union, and push it back onto the stack. | 5 3 2 | a b c<br>1 2 - -<br>2 - 3 -<br>3 - - 4<br>4 - 5 -<br>5 - - - |
| Read "a" from the input. It's a literal character, so add a new row to the table. | 5 3 2 | a b c<br>1 2 - -<br>2 - 3 -<br>3 - - 4<br>4 - 5 -<br>5 - - -<br>6 - - - |

FIG. 16b

| Point all the rows in the decision point list to the new row. Replace the decision point list with the new row's row number. | 6 | a b c<br>1 2 - -<br>2 6 3 -<br>3 6 - 4<br>4 - 5 -<br>5 6 - -<br>6 - - - |
|---|---|---|
| We've exhausted the input, so mark the states still on the decision point list as accepting states. There are no duplicate or unreferenced rows, so we're done. | 6 | a b c<br>1 2 - -<br>2 6 3 -<br>3 6 - 4<br>4 - 5 -<br>5 6 - -<br>6 - - - * |

FIG. 17a

| Description | Decision point stack | State table |
|---|---|---|
| Start with a table with one empty row and a decision point list containing just that row's row number. | 1 | a b c<br>1 - - - |
| Read "a" from the input. It's a literal character, so add a new row to the end of the table. Then update the rows in the decision point list to point to it and replace the decision point list with the new row's row number. | 2 | a b c<br>1 2 - -<br>2 - - - |
| Read "(" from the input. Create a new row and add it to the end of the table. Add this row number to the *beginning* of the decision point list. | 3 2 | a b c<br>1 2 - -<br>2 - - -<br>3 - - - |
| Now duplicate the decision point list, push an empty list onto the stack, and then push the duplicate onto the stack. | 3 2<br>-<br>3 2 | a b c<br>1 2 - -<br>2 - - -<br>3 - - - |
| Read "b" from the input and handle it in the usual way. | 4<br>-<br>3 2 | a b c<br>1 2 - -<br>2 - 4 -<br>3 - 4 -<br>4 - - - |
| Read "c" from the input and handle it in the usual way. | 5<br>-<br>3 2 | a b c<br>1 2 - -<br>2 - 4 -<br>3 - 4 -<br>4 - - 5<br>5 - - - |
| Read "\|" from the input. Pop the top three items off the stack (we'll number them 1, 2, and 3 in the order they were popped off the stack). Duplicate item 3, and push the original item 3 back onto the stack. Merge items 1 and 2 and push the result onto the stack. Now push the duplicate of item 3 onto the stack, where it becomes the new decision point list. (The top item in the stack is always the current decision point list. The second item down is the exit point list for the () expression, and the third item down is the original decision point list from when the ( was encountered.) | 3 2<br>5<br>3 2 | a b c<br>1 2 - -<br>2 - 4 -<br>3 - 4 -<br>4 - - 5<br>5 - - - |
| Read "c" from the input and handle it in the usual way. | 6<br>5<br>3 2 | a b c<br>1 2 - -<br>2 - 4 6<br>3 - 4 6<br>4 - - 5<br>5 - - -<br>6 - - - |
| Read "b" from the input and handle it in the usual way. | 7<br>5<br>3 2 | a b c<br>1 2 - -<br>2 - 4 6<br>3 - 4 6<br>4 - - 5<br>5 - - -<br>6 - 7 -<br>7 - - - |

FIG. 17b

| | | a b c |
|---|---|---|
| Read ")" from the input. Pop the top three items off the stack. Discard item 3. Merge items 1 and 2 together and push the result back onto the stack, where it becomes the current decision point list. | 7 5 | 1 2 - -<br>2 - 4 6<br>3 - 4 6<br>4 - - 5<br>5 - - -<br>6 - 7 -<br>7 - - - |
| Read "a" from the input and handle it in the usual way. | 8 | 1 2 - -<br>2 - 4 6<br>3 - 4 6<br>4 - - 5<br>5 8 - -<br>6 - 7 -<br>7 8 - -<br>8 - - - |
| Mark the remaining decision points as accepting states. | 8 | 1 2 - -<br>2 - 4 6<br>3 - 4 6<br>4 - - 5<br>5 8 - -<br>6 - 7 -<br>7 8 - -<br>8 - - - * |
| Remove duplicate and unreferenced rows. Row 3 is a duplicate of row 2, and also isn't referenced from anywhere. Row 7 is a duplicate of row 5. We squeeze these out and renumber the rest. | N/A | 1 2 - -<br>2 - 3 5<br>3 - - 4<br>4 6 - -<br>5 - 4 -<br>6 - - - * |

FIG. 18

| Description | Decision point stack | State table |
|---|---|---|
| Start with a table with one empty row and a decision point list containing just that row's row number. | 1 | a b c<br>1 - - - |
| Read "a" from the input and handle it in the usual way. | 2 | a b c<br>1 2 - -<br>2 - - - |
| Read "(" from the input. Create a new row and add it to the end of the table. Add this row number to the *beginning* of the decision point list. | 3 2 | a b c<br>1 2 - -<br>2 - - -<br>3 - - - |
| Now duplicate the decision point list, push an empty list onto the stack, and then push the duplicate onto the stack. | 3 2<br>-<br>3 2 | a b c<br>1 2 - -<br>2 - - -<br>3 - - - |
| Read "b" from the input and handle it in the usual way. | 4<br>-<br>3 2 | a b c<br>1 2 - -<br>2 - 4 -<br>3 - 4 -<br>4 - - - |
| Read "c" from the input and handle it in the usual way. | 5<br>-<br>3 2 | a b c<br>1 2 - -<br>2 - 4 -<br>3 - 4 -<br>4 - - 5<br>5 - - - |
| Read ")*" from the input. Merge the top three items on the decision point stack, and remember the row number at the beginning of item 3. | 5 3 2 | a b c<br>1 2 - -<br>2 - 4 -<br>3 - 4 -<br>4 - - 5<br>5 - - - |
| Merge row 3 (the row that was first in item 3) with each of the rows on the decision point stack. (Merging row 3 with row 3 doesn't do anything, of course, and since rows 2 and 3 are identical, row 2 also isn't affected.) | 5 3 2 | a b c<br>1 2 - -<br>2 - 4 -<br>3 - 4 -<br>4 - - 5<br>5 - 4 - |
| Now read "a" from the input and handle it in the usual way. | 6 | a b c<br>1 2 - -<br>2 6 4 -<br>3 6 4 -<br>4 - - 5<br>5 6 4 -<br>6 - - - |
| Mark the remaining decision points as accepting states. | 6 | a b c<br>1 2 - -<br>2 6 4 -<br>3 6 4 -<br>4 - - 5<br>5 6 4 -<br>6 - - - * |
| Remove duplicate and unreferenced rows. Rows 2, 3, and 5 are all duplicates (and nobody refers to row 3), so rows 3 and 5 are removed and everything else renumbered. | N/A | a b c<br>1 2 - -<br>2 4 3 -<br>3 - - 2<br>4 - - - * |

FIG. 19

| Description | Decision point stack | State table |
|---|---|---|
| Processing "a(bc\|cb" proceeds as outlined above, leaving us in this state. | 7<br>5<br>3 2 |   a b c<br>1 2 - -<br>2 - 4 6<br>3 - 4 6<br>4 - - 5<br>5 - - -<br>6 - 7 -<br>7 - - - |
| Read ")*" from the input. Merge the top three items on the decision point stack, and remember row 3 (the row number of the dummy row). | 7 5 3 2 |   a b c<br>1 2 - -<br>2 - 4 6<br>3 - 4 6<br>4 - - 5<br>5 - - -<br>6 - 7 -<br>7 - - - |
| Now merge row 3 with the rows in the decision point list. | 7 5 3 2 |   a b c<br>1 2 - -<br>2 - 4 6<br>3 - 4 6<br>4 - - 5<br>5 - 4 6<br>6 - 7 -<br>7 - 4 6 |
| Read "a" from the input and handle it in the usual way. | 8 |   a b c<br>1 2 - -<br>2 8 4 6<br>3 8 4 6<br>4 - - 5<br>5 8 4 6<br>6 - 7 -<br>7 8 4 6<br>8 - - - |
| The input has been exhausted, so mark the remaining decision points as accepting states. | 8 |   a b c<br>1 2 - -<br>2 8 4 6<br>3 8 4 6<br>4 - - 5<br>5 8 4 6<br>6 - 7 -<br>7 8 4 6<br>8 - - - * |
| Remove duplicate and unreferenced rows. This time, rows 2, 3, 5, and 7 are identical (and 3 is unreferenced), so we delete rows 3, 5, and 7 and renumber everything else. | N/A |   a b c<br>1 2 - -<br>2 5 3 4<br>3 - - 2<br>4 - 2 -<br>5 - - - * |

METHOD, SYSTEM, AND PROGRAM FOR GENERATING A DETERMINISTIC TABLE TO DETERMINE BOUNDARIES BETWEEN CHARACTERS

BACKGROUND OF THE INVENTION

1. Field of the Invention

Preferred embodiments provide a method, system, and program for generating a deterministic table to determine boundaries between characters.

2. Description of the Related Art

Computer text editors display words on a page such that characters within each word remain together. Words are typically separated by a whitespace or a punctuation, such as a period, comma, semi-colon, etc. During operation, a word processor may have to determine morphological boundaries in text, such as characters, words, sentences or paragraphs. For instance, when displaying strings comprising unseparated words on a line, the word processor may have to determine where to break the string between the unseparated words or, during operation of a spell check program, the word processor must go from the beginning to the end of the document to locate each word on which to perform a spell check operation. One program used to locate word, sentence or character boundaries in text is the International Business Machines Corporation ("IBM") BreakIterator. The BreakIterator program is a class in the Java Class Libraries, which is part of both the Java Developer Kit (JDK), which comprises programming tools for developers to create Java programs, and the Java Runtime Environment (JRE), which is the application to execute Java programs.** BreakIterator uses a state machine table to process each character to determine whether a morphological boundary has been reached.

** Java is a trademark of Sun Microsystems Inc.

A state machine provides an output based on one or more received inputs. A state machine in effect memorizes previous inputs to determine the current output. A non-deterministic state machine can indicate a multiple number of output states for a given input, whereas a deterministic state machine indicates only one output state given the input. The behavior of a deterministic machine can be defined in a state transition diagram, such as that shown in FIG. 1, which illustrates an example of the type of state machine BreakIterator uses.

FIG. 1 illustrates a state transition diagram, which shows all possible states as circles. The circles are connected by arrows representing possible state transitions. The arrows are labeled by the input values that cause the particular transition, e.g., the arrow from state 2 to state 4 indicates that the input is a digit. A double circle represents an accepting state. If the current state is an accepting state, and the next character in the text does not indicate a transition along any of the transition lines, than a word boundary is placed after the accepting state position. A single circle indicates a non-accepting state. If the current state is one of the non-accepting states, and the character in the next position does not provide a transition to an accepting state, then the end of word boundary is placed at the position following the previous accepting state from which the transition to the current non-accepting state occurred. For instance, if the current state is a letter (2), then receiving another letter will cause a transition (letter) back to the letter state (2), receiving a digit will cause a transition (digit) to the digit (4) state, or receiving a word punctuation will cause a transition (wordPunct) to the word punctuation state (3). Word punctuation refers to punctuation marks that are acceptable for use within words, such as hyphens and apostrophes. Digit punctuation refers to punctuation marks acceptable within numbers, such as a decimal point, comma, etc. If the current state is a digit (4) and number suffix is the next input character, then the transition (numSuffix) will lead to the number suffix state (6). Because there is no transition possible out of the number suffix state (6), a word boundary is placed thereafter. Alternatively, at the punctuation state (3 and 5) from the letterstate (2) or the number state (4), there is no transition if the next character is further punctuation. This means that at the punctuation non-accepting states (3 and 5), if the next character is punctuation, then a word boundary will be placed at the previous accepting state, which is the previous letter (2) or number (4) state, respectively, from which the non-accepting punctuation state (3 or 5) was reached. After placing a word boundary, control proceeds to the start state (1) to process the next characters in the text to determine a next word boundary.

FIG. 2 illustrates a representation of the state machine in FIG. 1 as a two dimensional array that the text editor program uses to determine word boundaries. The shaded rows indicate accepting states. A row indicates a current state and the column indicates an input at a current state. The circles representing states in FIG. 1 are labeled with numbers indicating the corresponding row representing that state in the table in FIG. 2. The value in the cell indicates the next row or state based on an input of the column value. For instance, values in row 1 are at the start state. The cell value in row 1, column 1 indicates determining a letter character following the start position, which causes a transition to row 2, which represents the transition 2 to the letter state. At a letter state, which is indicated as row 2 in the table, receiving an apostrophe or other punctuation causes the use of transition 3 to go to the punctuation state, which is represented by row 3 in the table in FIG. 2. If a letter is received as input in the punctuation state, then transition 2 occurs back to the letter state, which is the value in the first column (the letter column) in row 3. Anything other than a letter at the punctuation state, shown as the other columns in row 3 following the letter ("ltr") column, indicates no transition, which causes the insertion of a word boundary. Thus, at a state i, the next position is determined by the value in row i at the column corresponding to the character type at the next position. If the cell correpsonding to row i and the column for the character type in the next position is a number, then the next state is provided at the row corresponding to the number. If the cell with row i and the column corresponding to the next character are empty, then the word boundary has been reached.

In the prior art IBM BreakIterator product, the BreakIterator programmer must manually create and modify the state machine table shown in FIG. 2. Such manual editing of these tables can be time consuming and cumbersome. Thus, there is a need in the art to provide an improved system for generating the state machine table.

SUMMARY OF THE PREFERRED EMBODIMENTS

To overcome the limitations in the prior art described above, preferred embodiments disclose a method, system, and program for generating a data structure for use by a computer in determining a location of boundaries in text. The data structure is initialized and at least one regular expression is processed. Input characters in the at least one regular expression are then processed to determine at least one transition to at least one state. A determination is then made as to whether one input character would cause a transition to multiple states. If so, additional states are added to the data structure to transform the transition to multiple states to a deterministic transition.

In further embodiments, adding additional states comprises adding an additional state having a same number of output transitions as a number of non-deterministic output transitions from the non-deterministic state.

In still further embodiments, data structures are used to indicate states capable of transitioning to multiple states. In such case, each state having transitions to multiple states is updated to point to a new state providing deterministic transitions to the multiple states.

In certain implementations, the data structure is a table. In such case, initializing the data structure would involve defining columns in the table. Processing the input characters to determine at least one transition to at least one state comprises indicating one row as a decision point. An input character is received and a new row is added to the table for the input character. An input column corresponding to the input character in at least one decision point row is set to point to a row number of the added new row.

Preferred embodiments provide an algorithm for processing a set of regular expressions to generate a deterministic state table therefrom. With preferred embodiments, a word processing application developer need only define a set of regular expressions defining sequences of characters that form a known entity, such as a word, sentence or paragraph. In this way, if a software developer updates, modifies or completely replaces the set of regular expressions, the program may automatically generate a new deterministic state table machine from these regular expressions. Preferred embodiments allow developers to modify the set of regular expressions without having to spend time encoding a state table representing the regular expressions.

BRIEF DESCRIPTION OF THE DRAWINGS

Referring now to the drawings in which like reference numbers represents corresponding parts throughout:

FIG. 2 illustrates a table representing the state machine shown in FIG. 1 in a manner known in the art;

FIG. 4 illustrates an example of regular expressions used with preferred embodiments;

FIGS. 6a,b comprise a table providing an example of the application of the logic of FIG. 6 to derive columns from regular expressions in accordance with preferred embodiments of the present invention;

FIGS. 12 and 13 are tables providing examples of the application of the logic of FIGS. 7a,b to generate state tables in accordance with preferred embodiments of the present invention;

FIGS. 14a and 14b comprise a table providing an example of the application of the logic of FIGS. 8a, b to generate a state table in accordance with preferred embodiments of the present invention;

FIG. 15 is a table providing an example of the application of the logic of FIG. 9 to generate a state table in accordance with preferred embodiments of the present invention;

FIGS. 16a and 16b comprise a table providing an example of the application of the logic of FIG. 10 to generate a state table in accordance with preferred embodiments of the present invention; and FIGS. 17a, 17b, 18, and 19 are tables providing examples of the application of the logic of FIG. 11 to generate state tables in accordance with preferred embodiments of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
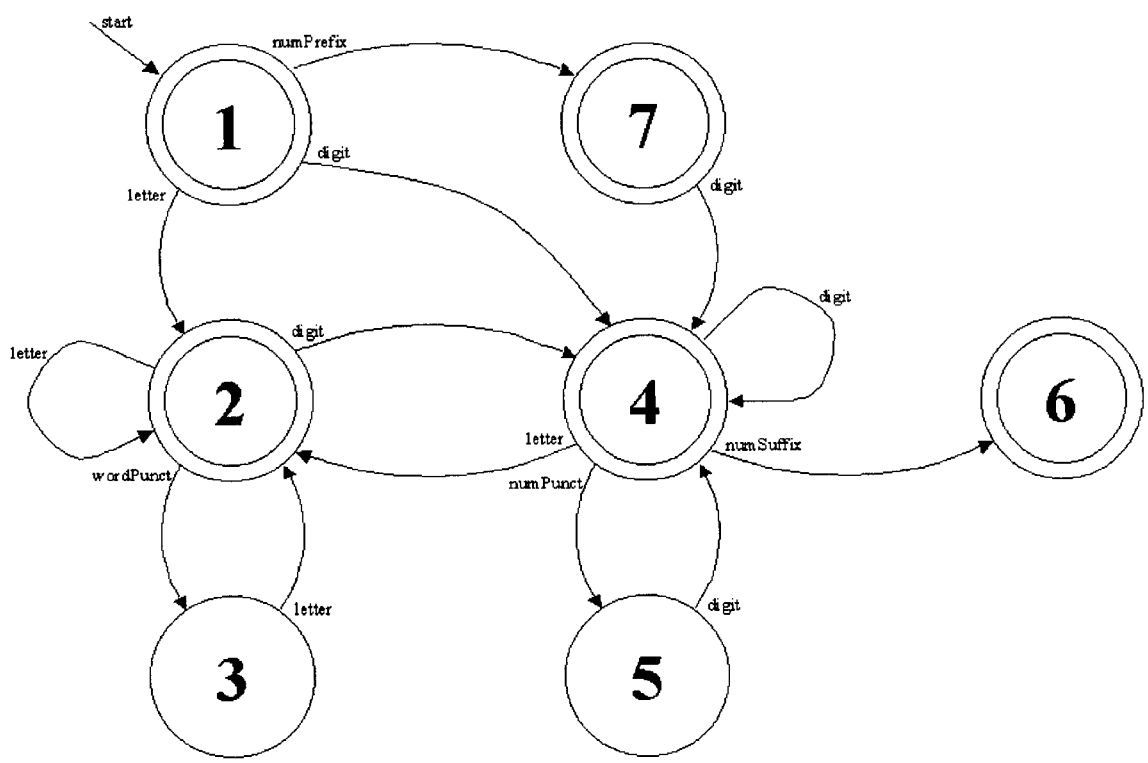
FIG. 1 illustrates a state machine to determine word boundaries in a document in a manner known in the art.
Figure 3:
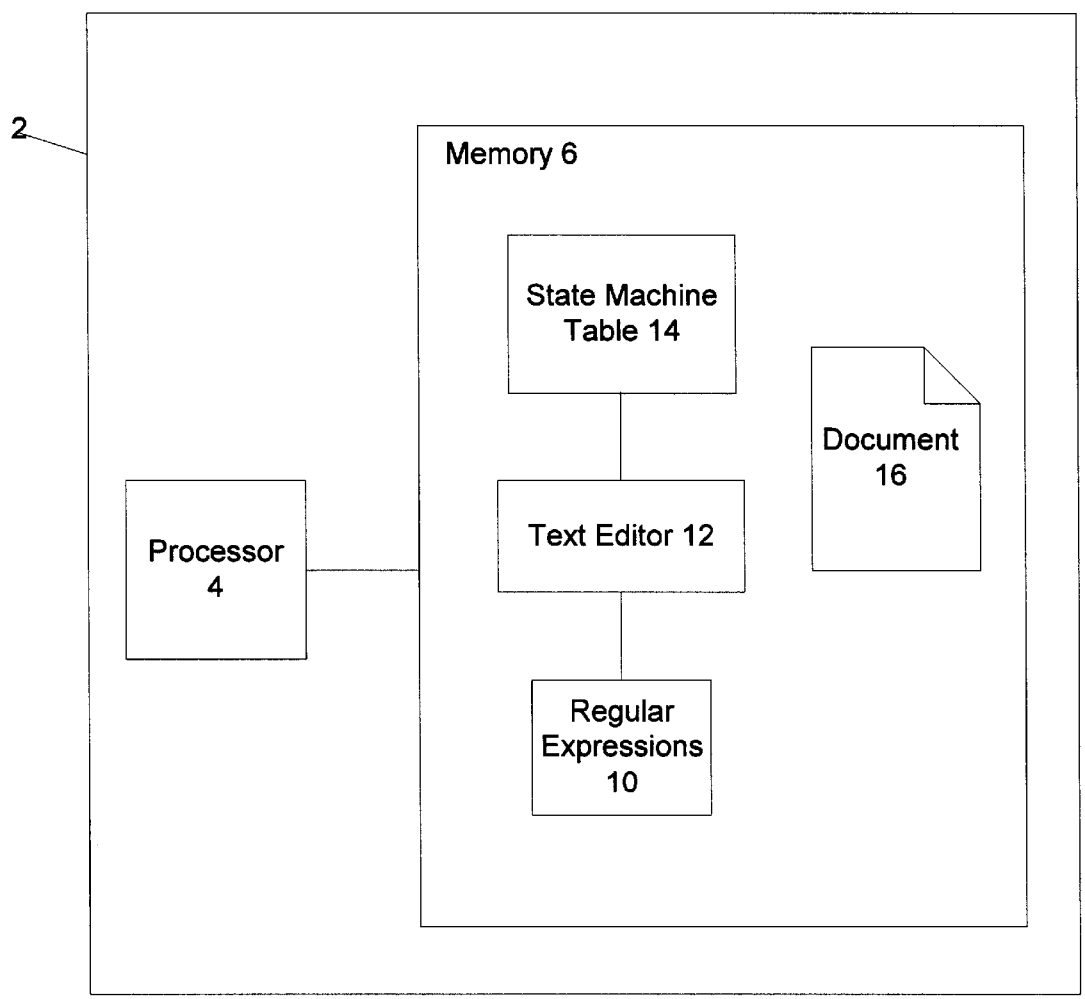
FIG. 3 illustrates a computing environment in which preferred embodiments are implemented.

FIG. 3 illustrates a computing environment in which preferred embodiments are implemented. The computing environment includes a computer system 2 having a processor 4 and a memory 6. The processor 4 may comprise any computer microprocessor device known in the art. The memory 6 may comprise any computer volatile memory device known in the art for storing data structures that the processor 4 is accessing and processing. Alternatively, the memory 6 may comprise any type of non-volatile storage device known in the art capable of being accessed by the processor 4, such as a hard disk drive, tape drive, etc.

The memory 6 includes a set of regular expressions 10, a text editor program 12, a table 14 representing a state machine to determine word boundaries, and a document 16. The state machine table 14 may be in the structure of the state machine table illustrated in FIG. 2. The text editor program 12 executes in memory 6 to process an input set of regular expressions 10 to generate a deterministic state machine table 14. If the text editor program 12 needs to determine word boundaries while moving forward through the characters in the document 16, the text editor would determine a next state in the state machine table 14 based on the character at the current position and the input character at the next position to determine whether a word boundary exists between two characters.

Preferred embodiments provide an algorithm for generating the state machine table 14 from the content of the regular expression set 10. FIG. 4 is a table providing an example of a set of regular expressions 20. A regular expression is a sequence of characters that describes a set of other sequences of characters. Matching a regular expression refers to the process of determining whether a particular sequence of characters meets the criteria defined by the regular expression. Regular expressions are used to describe a variety of searching and parsing operations. With respect to FIG. 4, the first column 22 provides the actual regular expressions, the middle column 24 a description of the regular expression, and the right-hand column 26 shows the first match in a string of sample text in bold that matches the regular expression in the first column 22.

Following is an example of the characters that may be used in a regular expression.

A literal character: (other than those listed below) matches that character. A special character can be preceded with a backslash to cause it to be treated as a literal character.

Brackets []: enclose groups of alternative characters. Inside brackets, the hyphen (–) may be used to indicate a contiguous range of characters, and the caret (^) may be used to exclude characters.

Braces {}: enclose parts of the expression which are optional. Braces may nest.

Parentheses ( ): enclose a subexpression. They have no effect by themselves, but can be used with the * to denote a repeating sequence of characters. Parentheses may nest.

The asterisk "*": causes the previous character, group of alternative characters, or sequence in parentheses to repeat. Zero or more repetitions of the thing before the asterisk will match this part of the regular expression.

The vertical bar "|": separates alternative subexpressions from one another. The vertical bar may be used with parentheses to separate the characters in the alternatives from the surrounding characters.

The above list is not intended to be exhaustive as to the possible special regular expression characters that may be utilized in a regular expression. In further embodiments, different special characters known in the art may also be used.

The set of regular expressions 10 define the behavior of the state machine table 14. Thus, the programmer would first build a set of regular expressions 10 by adding to the table 20 regular expressions to define strings of characters that form parsable or searchable units, i.e., words, sentences, paragraphs, etc.

Generating A State Machine Table from a Regular Expression

The first step in generating a state machine table, such as shown in FIG. 2, is to determine the columns for the table. In preferred embodiments, each column will represent a character category. To determine a transition, the text editor 12 would determine the column or character category including the input character, and then determine the value in the row of the current state to obtain the transition state/row. One solution would be to provide a column for each possible character. However, this method would be impractical for extremely large character sets such as Unicode, which comprise approximately 45,000 characters. Thus, preferred embodiments provide a way to utilize the regular expressions to form character categories comprised of multiple characters, such that each determined character category comprises a column in the state machine table 14.

Figure 5:
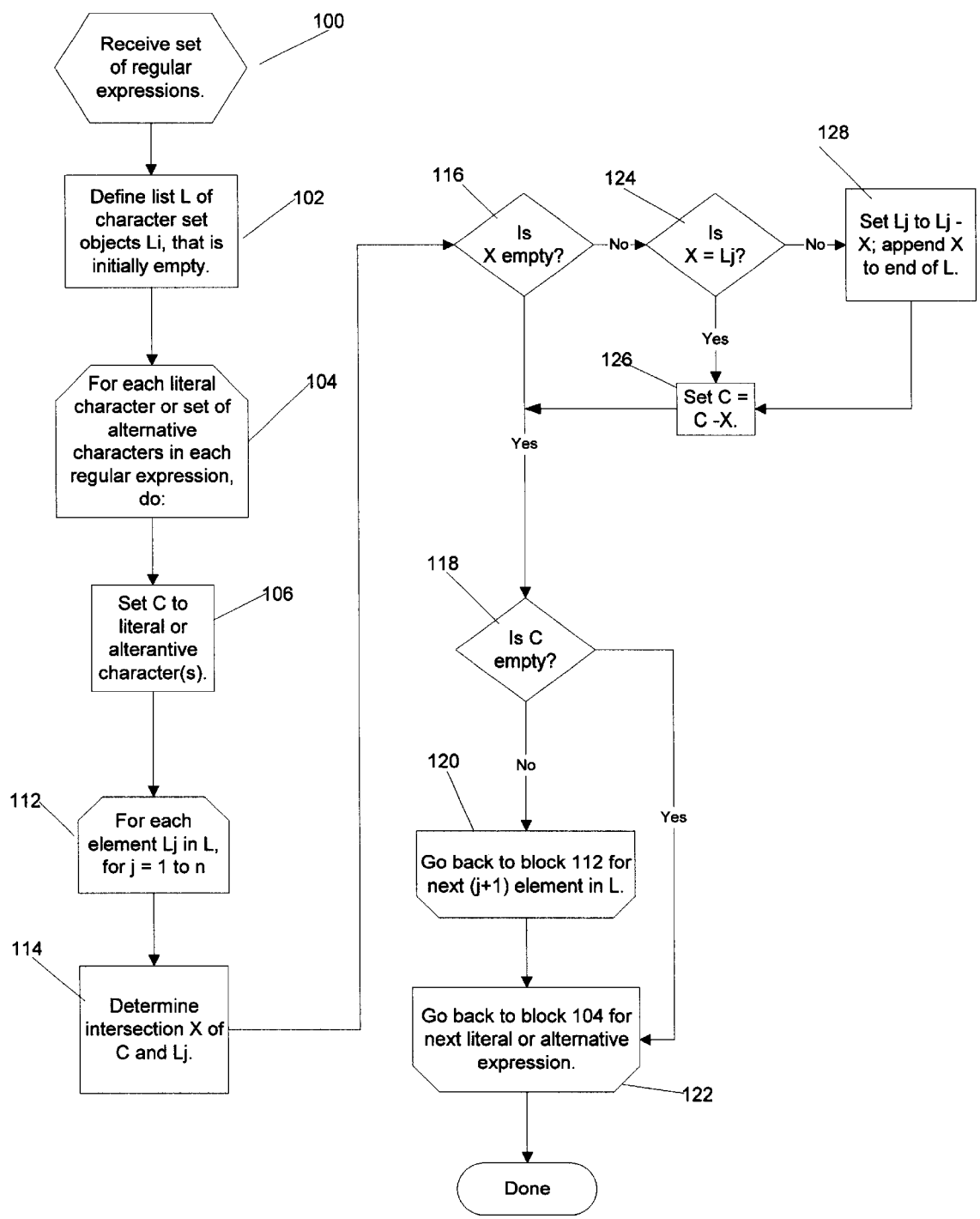
FIG. 5 illustrates logic to determine columns for the state machine table in accordance with preferred embodiments of the present invention.

FIG. 5 illustrates logic to form character categories from the literal characters and alternative character expressions within the regular expressions 10 that define the columns of the state machine table 14. The preferred logic of FIG. 5 groups characters from regular expressions into categories that define the columns of the table such that a single character never appears in more than one category. In other words, a set of characters will not be added to a current category if that set of characters intersects the set comprising the current category. This rule ensures that the intersection of any two character categories is the empty set. The logic to determine columns of character categories begins at block 100 in FIG. 5 with the text editor 12 receiving a set of regular expressions 10. The text editor 12 defines (at bock 102) a list L of character set objects $L_i$ that is initially empty.

A loop begins at block 104 for each literal character or alternative expression"[]" in the set of regular expressions 10. Within this loop, the text editor 12 sets (at block 106) object C to the literal character or alternative characters enclosed within brackets "[]". The object C is a set containing either the next literal character in the regular expression or the characters defined by the alternative expression "[]". Thus, C buffers character(s) from the regular expression before they are grouped into character categories. An inner loop begins at block 112 for each element $L_j$ in L, for j=1 to m, where m is the number of elements in L. Within this inner loop at block 112, the text editor 12 determines (at block 114) the intersection (X) of C and $L_j$. If X is empty (at block 116), i.e., L and C do not intersect, then the text editor 12 determines (at block 118) whether the C object is empty. If so, then control proceeds (at block 122) back to block 104 to perform another iteration of the loop at block 104 for the next literal character or alternative expression in the set of regular expressions 10. Otherwise, if C is not empty, then control proceeds (at block 120) back to block 112 to consider the next element $L_{(j+1)}$ in L.

If, at block 116, the text editor 12 determined that X is not empty, then a determination is made (at block 124) as to whether X equals $L_j$. If so, then C is set (at block 126) to the set comprising C minus X. Otherwise, if X is not equal to $L_j$, then the text editor 12 sets (at block 128) $L_j$ to the set comprising $L_j$ minus X, appends X to the end of L to form a new entry in L, and then proceeds to block 126. From block 126, control proceeds to block 118 to consider whether to continue comparing C against L to form further character categories from the object C.

After considering all regular expressions in the set of regular expressions 10, the logic ends and the elements $L_j$ in the list L form the non-intersecting character categories that comprise the columns of the state machine table 14. FIGS. 6a,b provide a table including an example of actions taken according to the algorithm in FIGS. 6a,b when parsing the characters and alternative expressions within regular expressions 10 comprising: [a–k]; [f–j]; [d–g]; [f–j]; a; [j–o^k]. The "Description" column explains an action performed, the "Value of C" provides the content of C after the occurrence of the action in the "Description" column, and the "Contents of L" provides the contents or elements in L after the occurrence of the action in the "Description" column.

After forming the columns of the state machine table 14 according to the logic in FIG. 5, the next step in the process is to populate the state machine table 14 with rows/states including cell values comprising a transition to another row/state. As discussed, the columns of this state machine table 14 are determined according to the logic of FIG. 5. Preferred embodiments utilize data structures that maintain a list of row numbers. One such data structure is a decision point list (DPL), and the second is a decision point stack (DPS) onto which decision point lists are stacked. A decision point list maintains all rows/states that need to be updated to point to the next newly created row, which includes the next state in the state table. Row numbers are added to the decision point list (DPL). Likewise, decision point lists (DPL) may be pushed onto and popped off the top of the decision point stack. Thus, items are removed from the stacks in the reverse order from how they are added, i.e., a last-in, first-out (LIFO) scheme. If there are multiple decision point lists (DPL) in the decision point stack (DPS), then processing with respect to a decision point list (DPL) refers to the decision point list at the top of the stack.

Figure 7A:
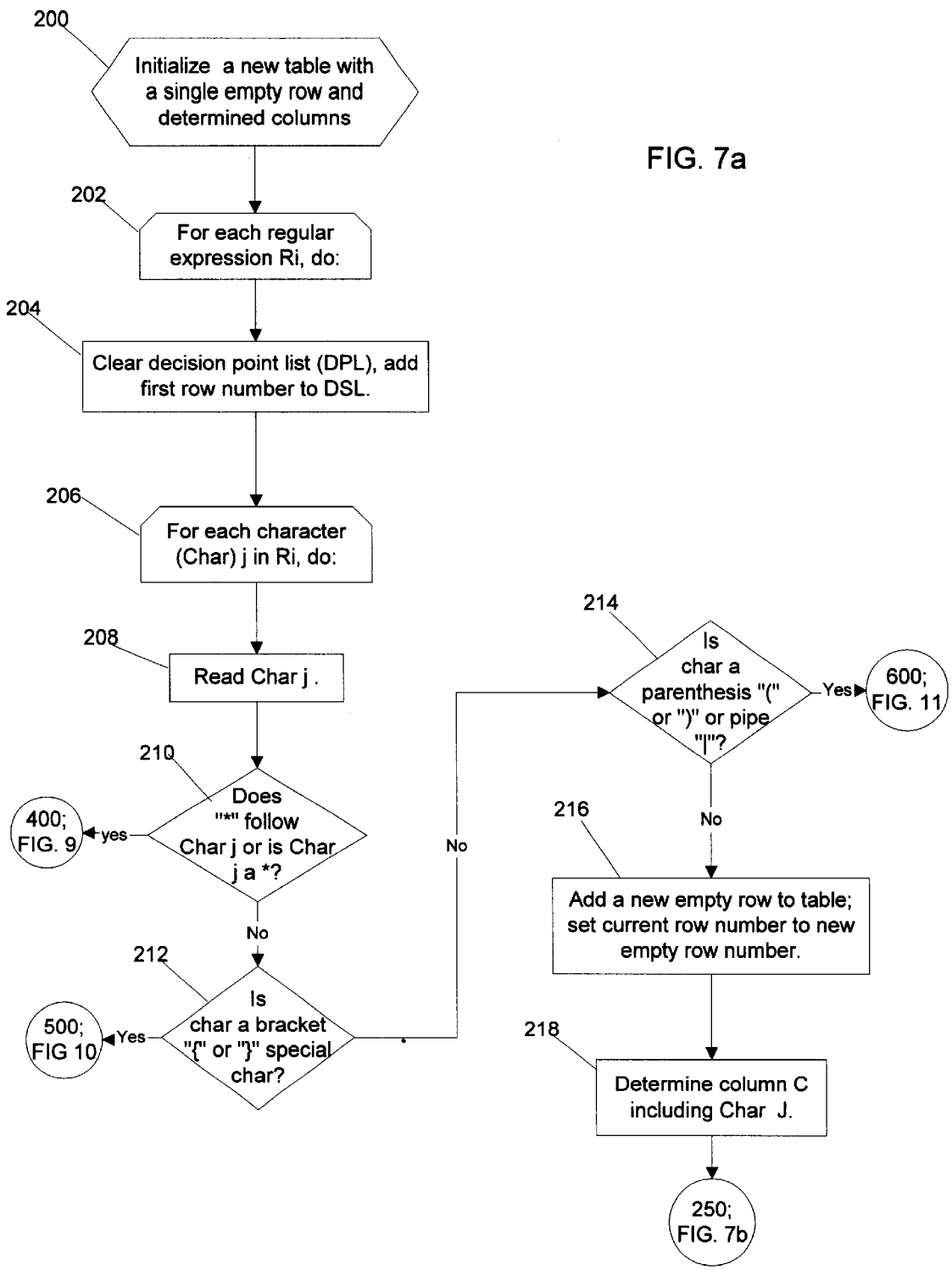
FIGS. 7a, 7b, 8a, 8b, 9, 10, and 11 illustrate logic to form a state table from a set of regular expressions in accordance with preferred embodiments of the present invention.

With respect to FIG. 7a, control begins at block 200 with the text editor 12 initializing a new table with a single empty row and the number of columns determined from a set of regular expressions 10 according to the logic of FIG. 5. After initializing the table, a loop begins at block 202 for each regular expression $R_i$ in the set of regular expressions 10. Within this loop, the text editor 12 clears (at block 204) the decision point list (DPL) and adds the first row number to the decision point list (DPL). An inner loop begins at block 206 for each character j (Charj) in the regular expression $R_i$. In preferred embodiments, character j refers to both a character and an alternative "[]" expression. This loop proceeds to block 208 to read character j ($Char_j$). The text editor 12 then proceeds through blocks 210, 212, and 214 to determine whether the character j is a special character that needs to be processed by the sub-routines at block 400 in FIG. 9, block 500 in FIG. 10 or block 600 in FIG. 11, respectively. If the character j is a literal character or alternative expression "[]", and not a special character, then the text editor adds (at block 216) a new empty row to the table and sets the current row number to the new empty row number. The current row number is a variable used in the processing. The text editor 12 then proceeds to determine (at block 218) the column C, or category of characters, of which character j is a member.

Figure 7B:
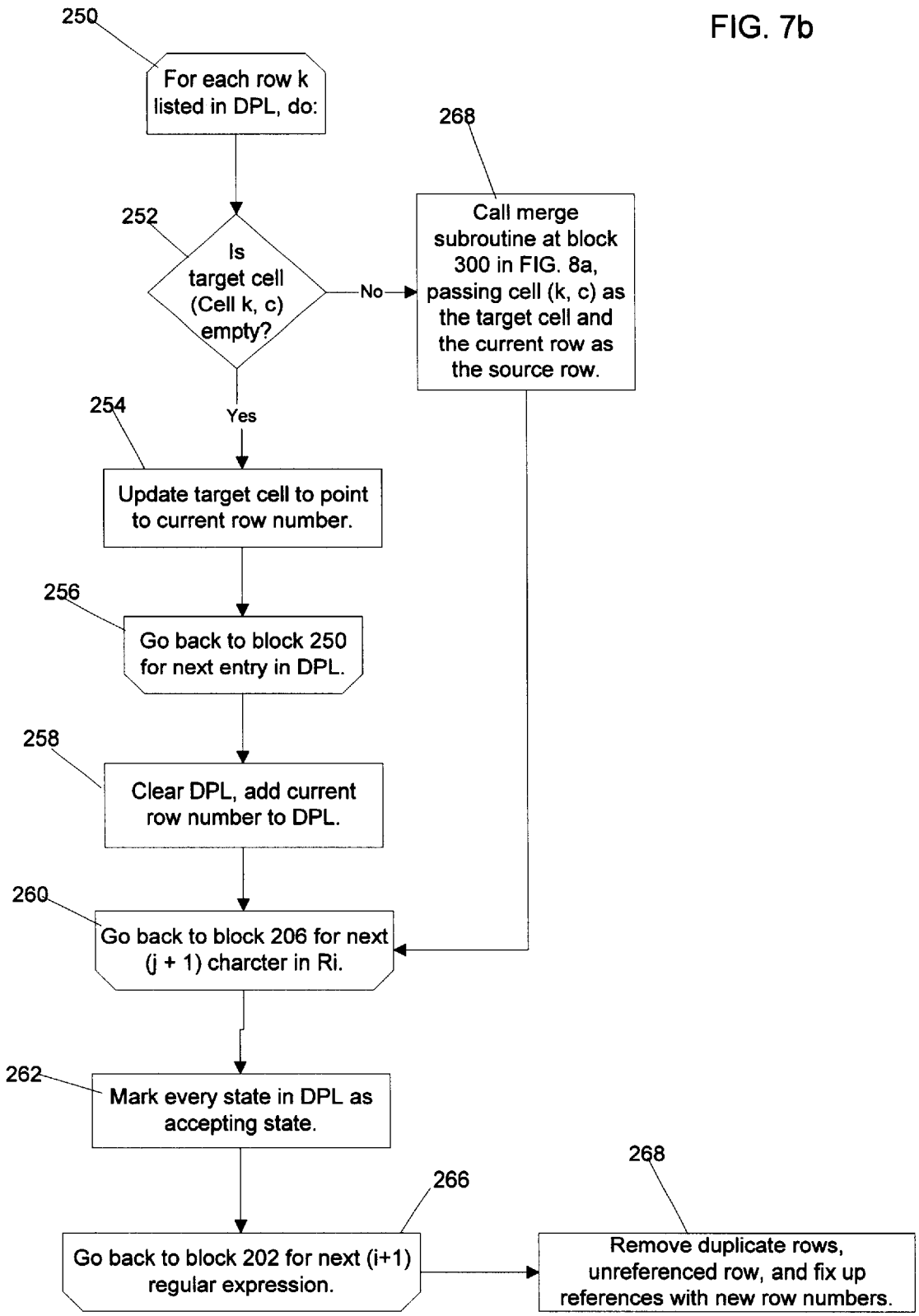

Control then proceeds to block 250 in FIG. 7b to begin yet another nested inner loop for each row k in the decision point list (DPL). This loop performs the operation of updating the rows in the decision point list (DPL) at column C to point to the next state. It is possible that one input can transition to different states or that different input characters will transition into the same state. To update the transition state/row in the DPL, the text editor 12 first determines (at block 252) whether a target cell in the DPL to update, at row k, column C ($Cell_{k,C}$), is empty. If the target cell ($Cell_{k,C}$) is empty, then the text editor 12 updates (at block 254) the value in the target cell ($Cell_{k,C}$) to point to the current row number. Control then proceeds (at block 256) back to block 250 to process the next (k+1) entry in the decision point list (DPL). If all k entries in the decision point list (DPL) have been processed, then the text editor 12 proceeds to block 258 and clears the decision point list (DPL) and adds the current row number, which was used to update previous values in the DPL, to the DPL. The text editor 12 then proceeds (at block 260) to process the next (j+1) character in the current regular expression $R_i$. After processing all characters in $R_i$, the text editor 12 proceeds (at block 262) to mark every state in the DPL as an accepting state. Control then proceeds (at block 266) to consider the next (i+1) regular expression $R_{(i+1)}$. After all regular expressions in the regular expression set 10 have been considered, duplicate and unreferenced rows may be removed and referenced numbers may be updated with new row numbers (at block 268). The resulting state table machine 14 would implement the transitions represented in the set of regular expressions 10.

FIG. 12 is a table providing an example of the actions taken according to the logic of FIGS. 7a and 7b to parse the regular expression comprising "abc." The "Description" column explains an action performed, the "Decision Point List" column showing the entries in the decision point list at the beginning of the action described in the "Description," and "State Table" indicates the content of the state table being formed after the operation described in the "Description." The operations described in FIG. 12 are straightforward as the decision point list (DPL) has only one entry at every stage of the process and no potential non-deterministic states.

FIG. 13 provides a table explaining the actions taken according to the logic of FIGS. 7a and 7b when there are two regular expressions "abc" and "bca." As with FIG. 13, in this example there are no special characters or non-deterministic states for any inputs in a given row/state.

If, at block 252 in FIG. 7b, the text editor 12 determines that the target cell ($Cell_{k,C}$) is not empty, then the value of the new row cannot be added to this cell because a single cell cannot point to two different rows/states at the same time, i.e., the table has a non-deterministic condition. In such case, control proceeds (at block 268) to block 300 in FIG. 8a to execute the a subroutine to create a new row including the current value in the target cell ($Cell_{k,C}$) and the update value, and then update the target cell ($Cell_{k,C}$) to point to this new row. Recursive calls to the merge subroutine are made if at any other point during the execution of the subroutine at block 300, another update value needs to be written to a non-empty target cell ($Cell_{k,C}$). After the occurrence of a non-deterministic state has been resolved to a deterministic state according to the subroutine at block 300, control proceeds to block 256 to consider the next (k+1) entry in the data point list (DPL).

The subroutine for handling non-deterministic states is passed two parameters, a target cell ($Cell_{k,C}$) to update and the current added row as the source or update value, which indicates the next state. With respect to FIG. 8a, control begins at block 300 with the text editor 12 determining whether the source or update value is empty or null. If so, the subroutine starting at block 300 ends (at block 302), and control returns to the location where the subroutine was called, and proceeds to block 256 to consider the next entry in the DPL table. Otherwise, if the source value is not empty, the text editor 12 determines (at block 304) whether the value in the target cell is the same as the update value. If so, control proceeds to block 302 to proceed to block 256 in FIG. 7b. If, on the other hand, the value in the target cell ($Cell_{k,C}$) is different from the update value, then a new row is added (at block 306) to the table. The text editor 12 then copies (at block 308) the row pointed to by the target cell ($Cell_{k,C}$), i.e., the row having a number equal to the value in the target cell ($Cell_{k,C}$), into the new row created at block 308, referred to herein as the new target row.

The text editor then begins a loop at block 350 to merge each column of the source row into the new target row. This would combine the rows/states to which the target cell ($Cell_{k,C}$) points into a single row, i.e., the new target row. To merge the states into the new target row, the text editor 12 performs the operations within the loop at block 350 for each column p in the new target row. The text editor 12 begins this loop by determining (at block 352) whether the cells in column p in the new target row and the source row are non-empty. If not, then the text editor copies (at block 354) the value in column p of the source row to column p of the new target row. The new target row number is then pushed (at block 356) onto the decision point list (DPL). The text editor 12 then proceeds (at block 358) back to block 350 to consider the next (p+1)th column.

Figure 8A:
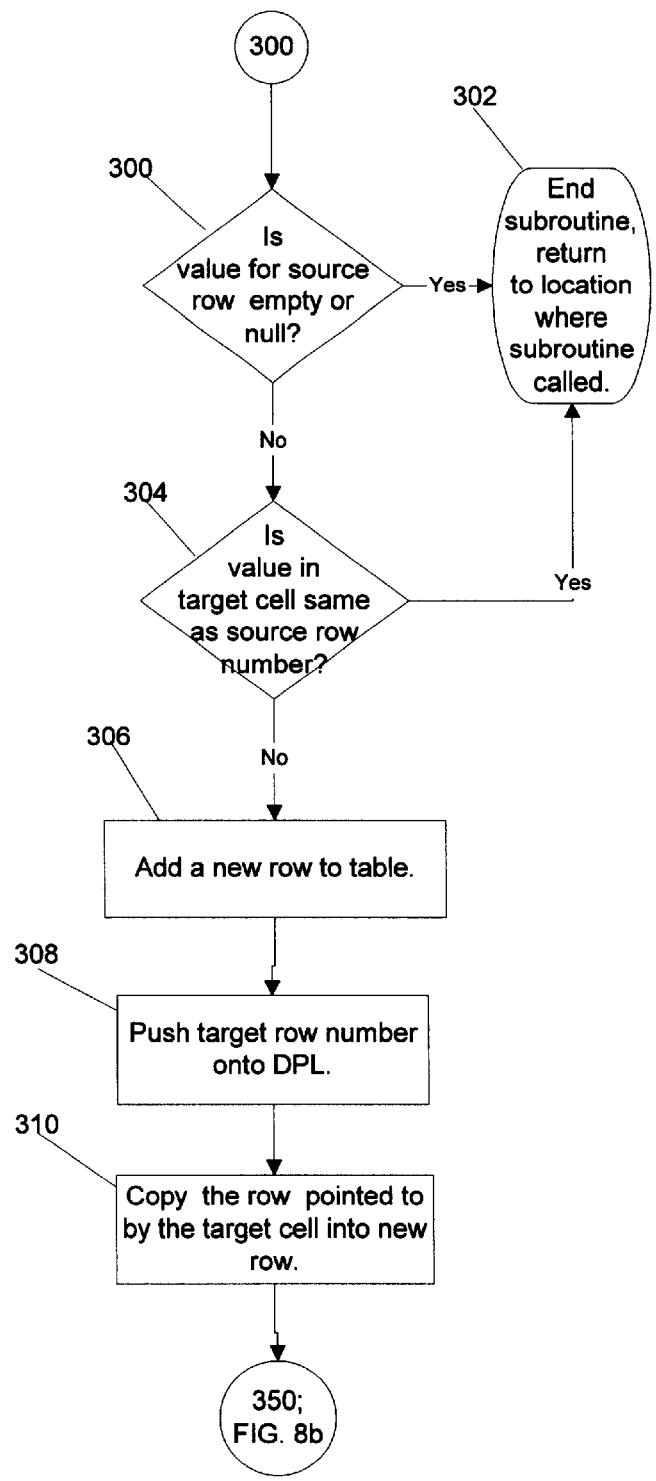

If, at block 352, the text editor 352 determined that the cells in column p of the new target and source rows were both non-empty, i.e., a non-deterministic state at this point, then the text editor 12 would make a recursive call (at block 360) to the merge subroutine at block 300 in FIG. 8a to convert this non-deterministic state to a deterministic one. The text editor 12 would pass the cell having the new target row and the column p as the target cell and the source row as the source row when calling this subroutine. After completing execution of the recursive subroutine at block 360, control would proceed to block 358 to consider the next (p+1)th column. After successfully combining the two non-deterministic states into the same row and into a deterministic state table, control returns (at block 362) to the point in the program where the merge subroutine of block 300 was called.

Figure 8B:
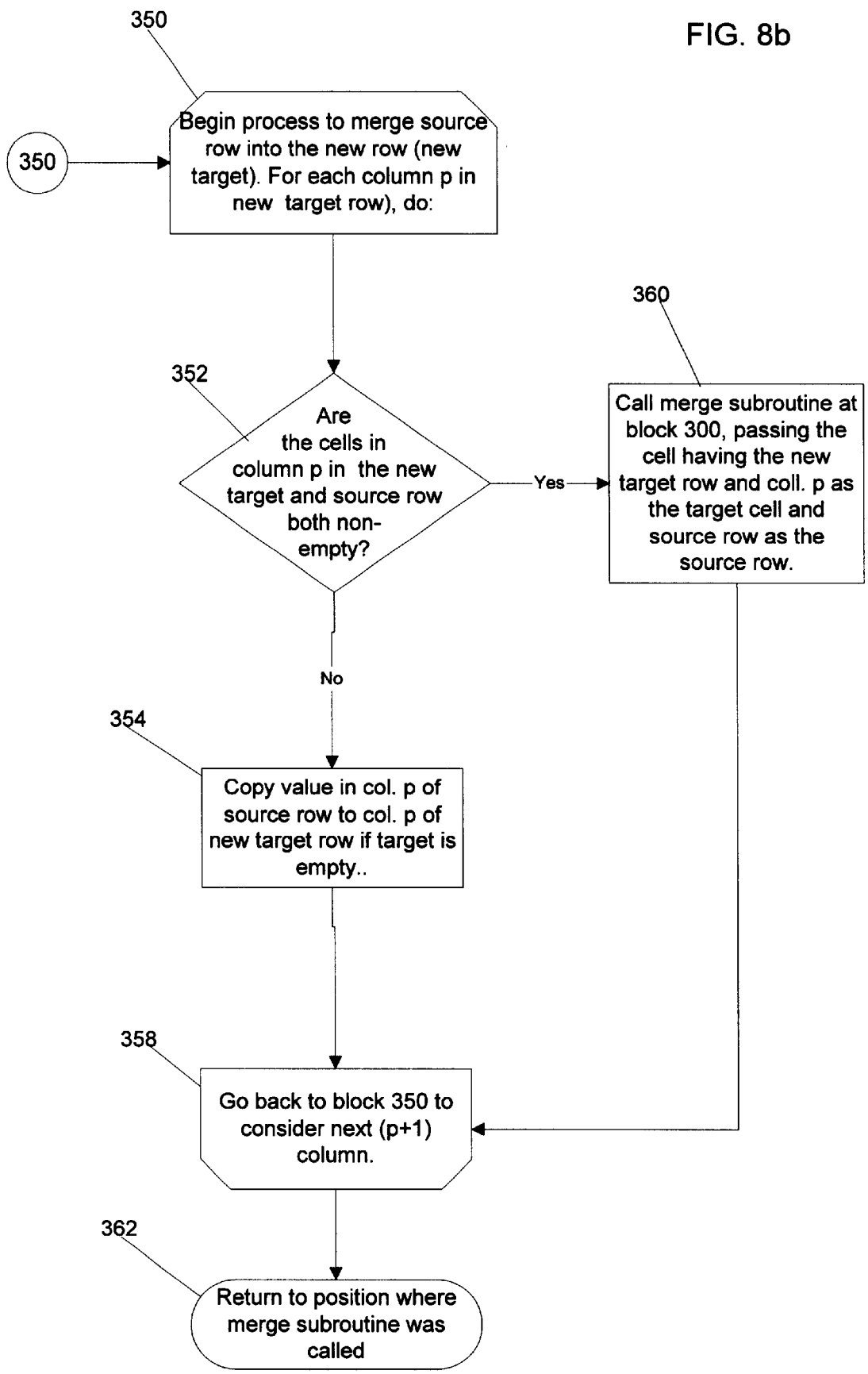

FIG. 14 provides a table explaining the actions taken according to the logic of FIGS. 7a, 7b, 8a, and 8b to parse the regular expression comprising "abc" and "acb." FIG. 14 describes provides an example of how the merge subroutine in FIGS. 8a and 8b would convert a non-deterministic situation to a deterministic state table. The "Description" column explains an action performed, the "Decision Point List" column show the entries in the decision point list at the beginning of the action described in the "Description," and "State Table" indicates the content of the state table being formed after the operation described in the "Description."

In certain edge conditions, the merge subroutine will go into an endless loop, continually adding rows to the table. To avoid this situation, the text editor 12 may maintain a list of all pairs of rows that have been merged already, along with the number of the row containing the result. This list is checked before creating any new rows. If the pair of rows being merged has been merged before, the text editor 12 sets the target cell to the row including the previously merged states of the target cell and source row. This avoids entering infinite loops.

As discussed, at blocks 210, 212, and 214, the text editor 12 may read a special character, such as an optional character, repeat character, alternative character,. etc. If, at block 210, the text editor determines that a repeat/option character ("*") follows character j or that character j is a repeat character, e.g., the star ("*"), then the text editor 12 proceeds to block 400 in FIG. 9 to process the repeat character. An optional repeat character indicates that the preceding character or group of characters can be repeated one or more times, or not be included at all in the string. The text editor determines (at block 402) whether the current character j is the repeat character ("*"). If not, then the text editor 12 duplicates (at block 404) the DPL and pushes the duplicate DPL onto the decision point stack (DPS). The text editor 12 then proceeds (at block 406) to return block 216 to continue the processing for character j.

If the character j is a *, then the text editor 12 sets (at block 410) the value in the row of the current entry in the DPL list to loop back to itself, which may include a call to the merge subroutine 300 if there is a need to make the table deterministic. Thus, for the column C including the character j, the text editor 12 sets the value in the cell having the row equal to the value in the decision point list (DPL) and the column C to the row value in the DPL, i.e., a state transitions back to itself. The text editor 12 then pops (at block 412) two entries from the decision point list (DPS) and merges them to form a new top entry on the DPL. The text editor 12 then proceeds (at block 414) to block 260 to consider the next character in the regular expression. If the character is a literal character, then all the rows in the decision point list, including merged, rows will be modified to point to the row of this next character.

Figure 9:
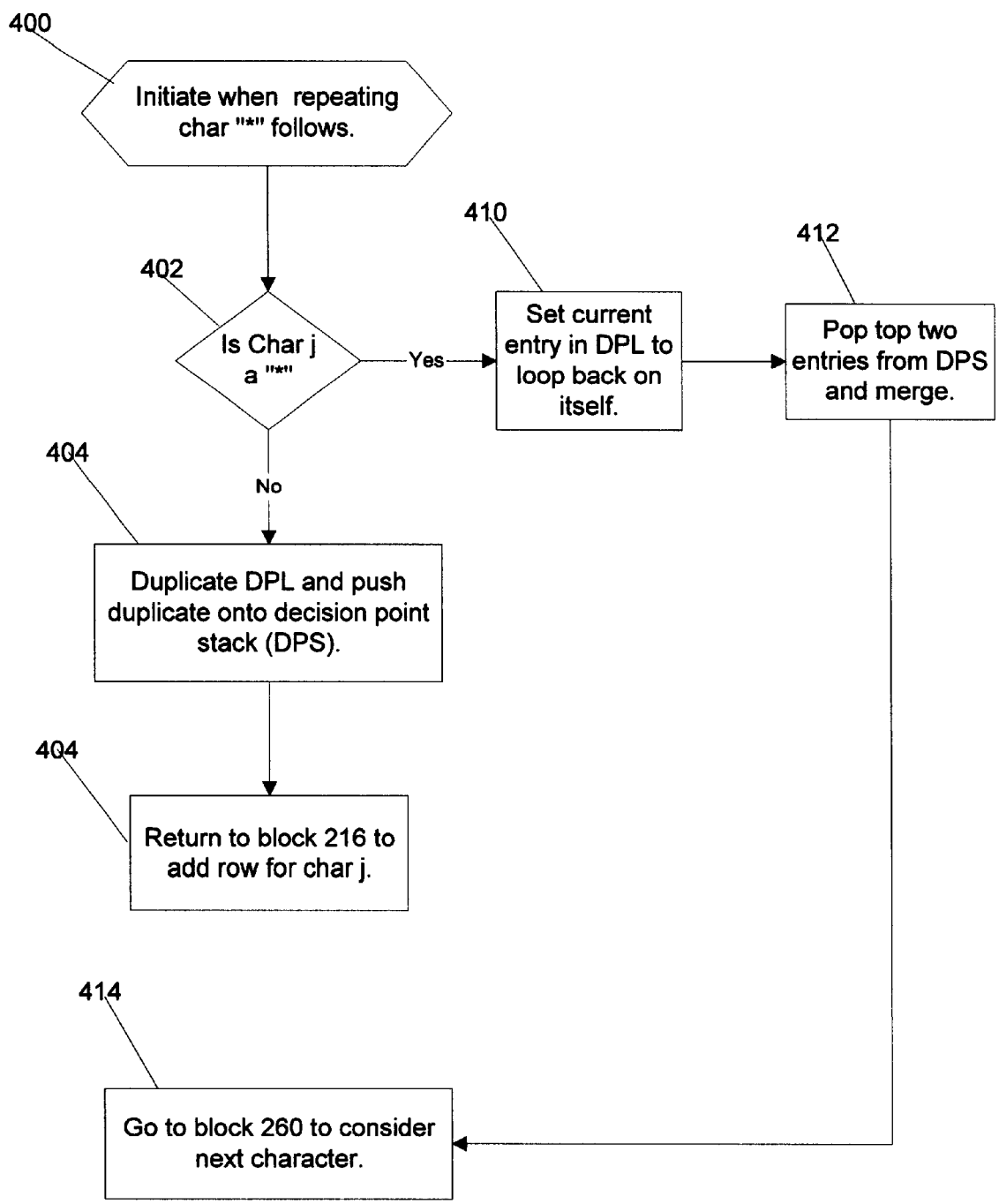

The logic of FIG. 9 for handling repeat characters highlights the use of the decision point list (DPL) to store all of the rows that have to be updated to point to the new row being created. A decision point list having multiple values indicates that a point or character can proceed to different states or sequences of characters, i.e., the string ab may have transition states to form the expressions abab or ababab. FIG. 15 is a table explaining the application of the logic of FIG. 9 to the string ab*c.

Figure 10:
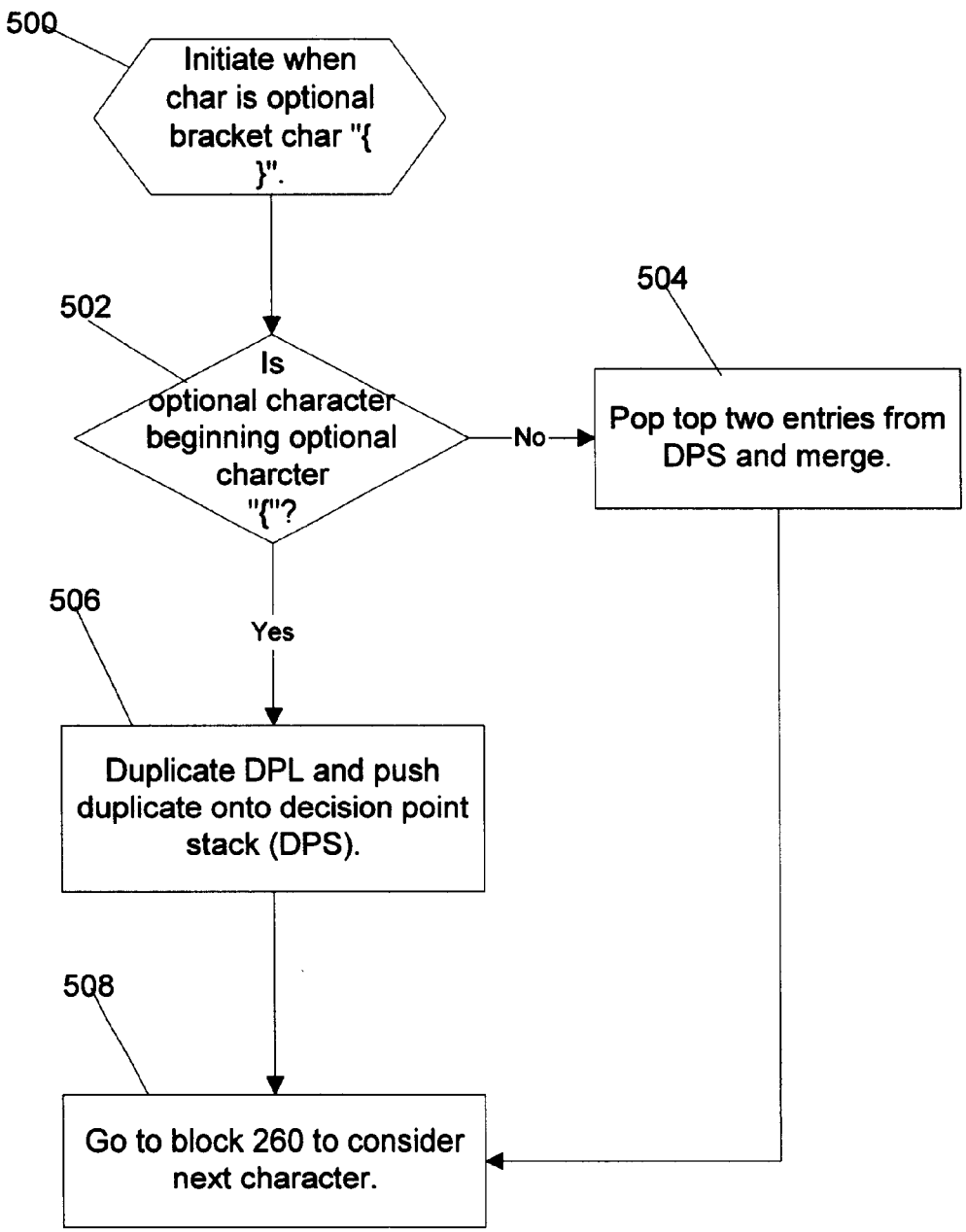

If the text editor 12, at block 212, determines that the character is an open "{" or closed "}" brace, then the routine at block 500 in FIG. 10 is executed. The text editor 12 determines (at block 502) whether the character is the beginning optional character "{". If not, the top two entries are popped (at block 504) off the decision point stack (DPS) and merged. The merged entries on the DPL indicate the states to update to point to the row for the next character if the next character is a literal character. If the character is not the closed brace, but the open brace, then the text editor 12 duplicates (at block 506) the decision point list (DPL) and pushes the duplicate DPL onto the decision point stack (DPS). From block 504 or 506, control proceeds (at block 508) to consider the next character at block 260 in FIG. 7b.

FIGS. 16a and 16b comprise a table explaining the application of the logic of FIG. 10 to generate deterministic state table entries for the regular expression "a{b{cb}}a".

The parentheses require additional entries in the decision point list (DPL) and stack (DPS) because the expression may contain several alternative sequences of characters. Each possible alternative sequence of characters is separated from the others by the pipe "|" character. If at block 214, the text editor 12 determines that the character j is a open "(" or closed ")" parenthesis or pipe ("|"), then the text editor 12 executes the routine at block 600 in FIG. 11. If (at block 602) the character is an open parenthesis, then the text editor adds (at block 604) a new empty row to the table, and adds the new empty row number to the beginning of the decision point list (DPL). A duplicate of the decision point list (DPL) is created (at block 606) and the text editor 12 pushes (at block 608) an empty decision point list (DPL) on the decision point stack (DPS), then pushes the duplicate DPL on the DPS. The text editor 12 then proceeds (at block 610) to read the next character at block 260 in FIG. 7b. The duplicate DPL at the top of the stack forms an additional path from the state represented by the DPL row, such that one DPL entry transitions from the state before the parentheses to the first alternative expression within the parentheses and another DPL entry transitions from the same state to another alternative expression within the parentheses.

The dummy or empty DPL is used to process the alternative expression character "|". Inside parentheses, the text editor 12 must keep track of the end of each alternative expression that leads to the end of the parentheses. With alternative characters "|", the end of the parentheses could point back to multiple alternative sequences within the parentheses. To handle this situation, an extra "dummy" DPL state/row is created that will not be pointed to by another state. This dummy state/row contains all the states that the parentheses can loop back to, i.e., the end characters in each alternative sequence in the parentheses. After the open parenthesis, the decision point stack includes a top DPL at the point before the open parenthesis, a blank or dummy DPL, and then a duplicate of the DPL at the point before the parenthesis. Thus, the DPL at the top of the DPS is used to point from the state before the parentheses to the first alternative in the parentheses, and the DPL third on the DPS will point from the state before the parentheses to a second alternative within the parentheses.

If, at block 214, the character j is an alternative character "|", then at block 612, the text editor 12 pops (at block 614) three DPL entries off the DPS. The DPL 3 is duplicated (at block 616) and the original DPL 3 is then pushed onto the stack. DPLs 1 and 2 are merged (at block 618) and pushed onto the stack and then the duplicate of DPL 3 is pushed (at block 620) onto the DPS. From there, control proceeds (at block 610) to block 260 in FIG. 7b to read the next character.

With this method, the top DPL on the stack is always the current DPL, the second item down is the exit point DPL to process beyond the parentheses, and the third DPL is the original DPL from when the opening parentheses "(" was encountered.

If, at block 214, character j is a closed parenthesis ")", then (at block 622), the text editor 12 determines (at block 624) whether the closed parenthesis is followed by the repeat character "*". If not, then the top two decision point lists (DPL) are popped from the DPS and merged (at block 664). The next DPL is then popped (at block 628) off the stack and discarded. The merged DPL (at block 626) is then pushed (at block 630) back onto the DPS.

Finally, if (at block 622), the closed parenthesis is followed by the repeat character, then the text editor pops (at block 632) the top three list and saves off the first entry in the third DPL entry. The three DPLs are then merged (at block 634) and then pushed (at block 636) onto the DPS. Each of the rows in the DPL are then merged with the dummy row, which is the saved off first entry in the third DPL using the merge subroutine at block 300.

Figure 11:
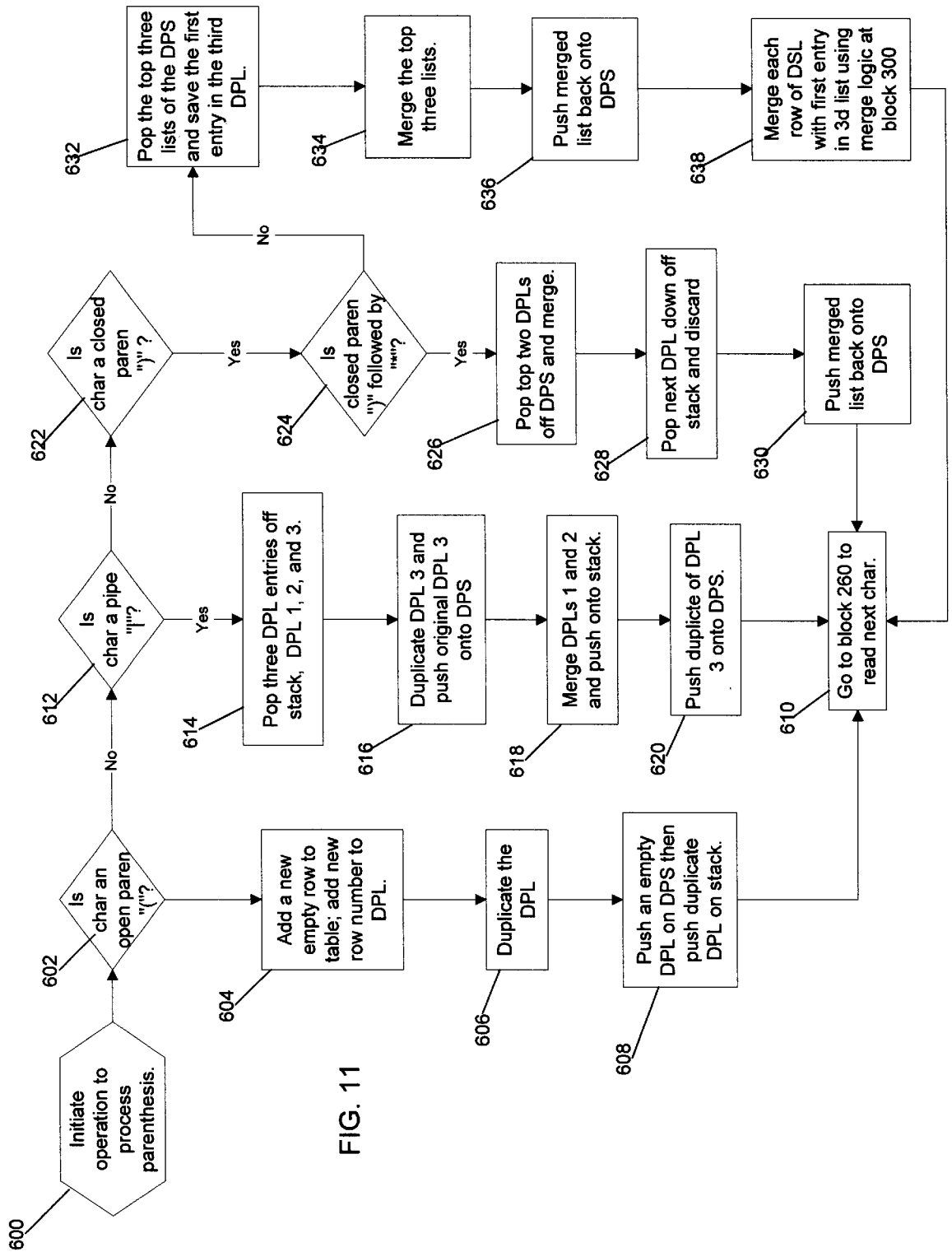

FIGS. 17a and 17b provide a table of actions based on the logic of FIG. 11 to process the alternative sequence "a(bc|cb) a." FIG. 18 provides a table of actions based on the logic of FIG. 11 to process an alternative expression followed by a repeat character, "a(bc)*a." FIG. 19 provides a table of actions based on the logic of FIG. 11 to process an alternative expression followed by a repeat character, "a(bc|cb)*a."

In this way, preferred embodiments provide a mechanism for processing a set of regular expressions 10, forming a state table from the regular expressions. When characters in the regular expression define a non-deterministic transition state, the preferred logic will make the transitions deterministic to form a deterministic state machine table 14.

With preferred embodiments, a word processing application developer need only define a set of regular expressions defining sequences of characters that form a known entity, such as a word, sentence or paragraph. In this way, if a software developer updates, modifies or completely replaces the set of regular expressions, the program may automatically generate a new deterministic state table machine from these regular expressions. Preferred embodiments allow developers to modify the set of regular expressions without having to spend time encoding a state table representing the regular expressions.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

The state machine table may be generated from the preferred logic whenever a word processing program including the regular expressions is initialized. Alternatively, the word processor developer could use the preferred logic to generate a state table from a set of regular expressions and then include only the state table in the word processing program. Whenever the word processor developer updates the set of regular expressions, the word processor could then use the preferred logic to generate a modified state table and then distribute the modified state table to users of the word processor through an update or fix program.

The preferred embodiment algorithms of FIGS. 5 and 6 may be implemented in an object oriented program language such as Java, or, in further embodiments, any other programming language known in the art.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

Preferred embodiments described processing with respect to specific special characters. However, further special and other characters may be incorporated into the logic to form a deterministic state machine table.

The preferred algorithm is mostly an iterative process with the use of recursive logic to handle non-deterministic transitions. However, in alternative embodiments, the algorithm could be rewritten as a recursive algorithm.

Preferred embodiments described the state machine as implemented as a table. In alternative embodiments, the state machine may be implemented in different types of data structures.

Preferred embodiments described the rows in the tables as having certain values and the columns other. In alternative embodiments, the values maintained in the rows and columns may be switched.

Preferred embodiments were described with respect to using regular expressions to find permissible textual boundaries, such as words, sentences, paragraphs, etc. However, the regular expressions could be used to define any acceptable string, including computer instructions or the acceptability of any other type of symbolic text that has meaning. For instance, the regular expressions could be used to define the rules used during parsing and lexical analysis of computer program source code. The regular expressions could be used to define how to parse a computer program into units of functions or commands. The compiler would then transform each specific command to executable code. In this way, the state table generated according to preferred embodiments would define how to parse or perform lexical analysis on computer code.

In summary, the present invention provides a system, method, and program for generating a data structure for use by a computer in determining a location of boundaries in text. The data structure is initialized and at least one regular expression is processed. Input characters in the at least one regular expression are then processed to determine at least one transition to at least one state. A determination is then made as to whether one input character would cause a transition to multiple states. Additional states are added to the data structure to transform the transition to multiple states to a deterministic transition.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating a table for use by a computer in determining a location of boundaries in text, comprising:
   initializing the table by defining columns in the table;
   processing at least one regular expression;
   processing input characters in the at least one regular expression to determine at least one transition to at least one state by:
      (i) indicating one row as a decision point;
      (ii) receiving an input character;
      (iii) adding a new row to the table for the input character; and
      (iv) setting an input column corresponding to the input character in at least one decision point row to point to a row number of the added new row determining whether one input character would cause a transition to multiple states; and
   adding additional states to the table to transform the transition to multiple states to a deterministic transition.

2. The method of claim 1, wherein adding additional states comprises adding an additional state having a same number of output transitions as a number of output transitions from the non-deterministic state.

3. The method of claim 1, further comprising:
   using data structures to indicate states capable of transitioning to multiple states;
   updating one state having transitions to multiple states to point to a new state providing deterministic transitions to the multiple states.

4. The method of claim 1, wherein defining the table having columns further comprises processing the regular expressions to determine categories of characters that each form one of the columns in the table.

5. The method of claim 4, wherein processing the regular expressions comprises forming categories of characters where no subset of the categories intersects any other category of characters.

6. The method of claim 1, wherein the new row is a source row and a target cell comprises a target cell in the decision point row in the input column, wherein determining whether one input character would cause transition to multiple states comprises determining whether the target cell is empty, wherein the target cell is set to point to a number of the added new row if the target cell is not empty; and wherein adding additional states comprises executing a merge routine to add additional states to have the state represented by the target cell point to the state represented by the row pointed to by the target cell and the state represented by the source in a deterministic manner.

7. The method of claim 6, wherein execution of the merge routine comprises:
   adding an additional new row to the table if the target cell is not empty; and
   merging the content of the row pointed to by the target cell and the source row into the additional new row if the target cell is not empty.

8. The method of claim 7, wherein merging the content into the added new row further comprises:
   copying the content of the row pointed to by the target cell to the additional new row to form a new target row;
   copying, for each column, the content of the source row into the column in the new target row if the column in the new target row is empty; and
   recursively performing the merge routine if one column in the new target row is not empty.

9. The method of claim 1, further comprising performing, upon determining that a character following the input character is a repeat character:
   indicating duplication of a pre-repeat decision point row pointing to a character before the character that is before the repeat character; and
   setting a value in the column corresponding to the character before the repeat in the pre-repeat decision point row to point to a row that has a value in the column corresponding to a character following the repeat character and in the column corresponding to the character before the repeat character.

10. The method of claim 1, further comprising performing, upon determining that the input character indicates the beginning of an optional expression:
    indicating duplication of a pre-optional expression decision point row for a character before a beginning of the optional expression; and
    setting a value in the column corresponding to the character following the optional expression in the pre-optional expression decision point row to point to a row that has a value in the column corresponding to a character following the optional expression and in the column corresponding to a first character within the optional expression.

11. A method for generating a table for use by a computer in determining a location of boundaries in text, comprising:
    initializing the table by defining columns in the table;
    processing at least one regular expression;
    processing input characters in the at least one regular expression to determine at least one transition to at least one state by:
       (i) indicating one row as a decision point;
       (ii) receiving an input character;
       (iii) adding a new row to the table for the input character; and
       (iv) setting an input column corresponding to the input character in at least one decision point row to point to a row number of the added new row;
    determining whether one input character would cause a transition to multiple states; and
    adding additional states to the table to transform the transition to multiple states to a deterministic transition;
    determining whether the input character is a special character; and
    indicating duplicates of the decision point row to allow for multiple sequences of characters from one decision point.

12. A method for generating a table for use by a computer in determining a location of boundaries in text, comprising:
    initializing the table by defining columns in the table;
    processing at least one regular expression;
    processing input characters in the at least one regular expression to determine at least one transition to at least one state by:
       (i) indicating one row as a decision point;
       (ii) receiving an input character;
       (iii) adding a new row to the table for the input character; and
       (iv) setting an input column corresponding to the input character in at least one decision point row to point to a row number of the added new row;

determining whether one input character would cause a transition to multiple states; and adding additional states to the table to transform the transition to multiple states to a deterministic transition; and performing, upon determining that the input character indicates the beginning of an alternative expression, indicating duplicates of the decision point row to allow for alternative sequences of characters from one decision point.

13. A computer system for generating a table for determining a location of boundaries in text, comprising:

means for initializing the table by defining columns in the table;

means for processing at least one regular expression means for processing input characters in the at least one regular expression to determine at least one transition to at least one state:
 (i) indicating one row as a decision point;
 (ii) receiving an input character;
 (iii) adding a new row to the table for the input character; and
 (iv) setting an input column corresponding to the input character in at least one decision point row to point to a row number of the added new row means for determining whether one input character would cause a transition to multiple states; and means for adding additional states to the table to transform the transition to multiple states to a deterministic transition.

14. The computer system of claim 13, wherein the means for adding additional states comprises adding an additional state having a same number of output transitions as a number of output transitions from the non-deterministic state.

15. The computer system of claim 13, further comprising:
means for using data structures to indicate states capable of transitioning to multiple states;
means for updating one state having transitions to multiple states to point to a new state providing deterministic transitions to the multiple states.

16. The computer system of claim 13, wherein the means for defining the table having columns further processes the regular expressions to determine categories of characters that each form one of the columns in the table.

17. The computer system of claim 16, wherein the means for processing the regular expressions forms categories of characters where no subset of the categories intersects any other category of characters.

18. The computer system of claim 13, wherein the new row is a source row and a target cell comprises a target cell in the decision point row in the input column, wherein the means for determining whether one input character would cause a transition to multiple states determines whether the target cell is empty, wherein the target cell is set to point to a number of the added new row if the target cell is not empty; and wherein the means for adding additional states executes a merge routine to add additional states to have the state represented by the target cell point to the state represented by the row pointed to by the target cell and the state represented by the source in a deterministic manner.

19. The computer system of claim 18, wherein execution of the merge routine comprises:
adding an additional new row to the table if the target cell is not empty; and
merging the content of the row pointed to by the target cell and the source row into the additional new row if the target cell is not empty.

20. The computer system of claim 19, wherein merging the content into the added new row further comprises:
copying the content of the row pointed to by the target cell to the additional new row to form a new target row;
copying, for each column, the content of the source row into the column in the new target row if the column in the new target row is empty; and
recursively performing the merge routine if one column in the new target row is not empty.

21. The computer system of claim 13, further comprising means for performing, upon determining that a character following the input character is a repeat character:
indicating duplication of a pre-repeat decision point row pointing to a character before the character that is before the repeat character; and
setting a value in the column corresponding to the character before the repeat in the pre-repeat decision point row to point to a row that has a value in the column corresponding to a character following the repeat character and in the column corresponding to the character before the repeat character.

22. The computer system of claim 13, further comprising mean for performing, upon determining that the input character indicates the beginning of an optional expression:
indicating duplication of a pre-optional expression decision point row for a character before a beginning of the optional expression; and
setting a value in the column corresponding to the character following the optional expression in the pre-optional expression decision point row to point to a row flat has a value in the column corresponding to a character following the optional expression and in the column corresponding to a first character within the optional expression.

23. A computer system for generating a table for determining a location of boundaries in text, comprising:
means for initializing the table by defining columns in the table;
means for processing at least one regular expression;
means for processing input characters in the at least one regular expression to determine at least one transition to at least one state by:
 (i) indicating one row as a decision point;
 (ii) receiving an input character;
 (iii) adding a new row to the table for the input character; and
 (iv) setting an input column corresponding to the input character in at least one decision point row to point to a row number of the added new row;
means for determining whether one input character would cause a transition to multiple states;
means for adding additional states to the table to transform the transition to multiple states to a deterministic transition;
means for determining whether the input character is a special character; and
means for indicating duplicates of the decision point row to allow for multiple sequences of characters from one decision point.

24. A computer system for generating a table for determining a location of boundaries in text, comprising:
means for initializing the table by defining columns in the table;
means for processing at least one regular expression;

means for processing input characters in the at least one regular expression to determine at least one transition to at least one state by:
  (i) indicating one row as a decision point;
  (ii) receiving an input character;
  (iii) adding a new row to the table for the input character; and
  (iv) setting an input column corresponding to the input character in at least one decision point row to point to a row number of the added new row;

means for determining whether one input character would cause a transition to multiple states;

means for adding additional states to the table to transform the transition to multiple states to a deterministic transition;

means for determining whether the input character is a special character;

means for indicating duplicates of the decision point row to allow for multiple sequences of characters from one decision point; and means for performing, upon determining that the input character indicates the beginning of an alternative expression, indicating duplicates of the decision point row to allow for alternative sequences of characters from one decision point.

25. An article of manufacture for generating a table for use by a computer in determining a location of boundaries in text, the article of manufacture comprising a computer usable medium including at least one computer program that causes the computer to perform:

initializing the table by defining columns in the table;

processing at least one regular expression;

processing input characters in the at least one regular expression to determine at least one transition to at least one state by:
  (i) indicating one row as a decision point;
  (ii) receiving an input character;
  (iii) adding a new row to the table for the input character; and
  (iv) setting an input column corresponding to the input character in at least one decision point row to point to a row number of the added new row determining whether one input character would cause a transition to multiple states; and adding additional states to the table to transform the transition to multiple states to a deterministic transition.

26. The article of manufacture of claim 25, wherein adding additional states comprises adding an additional state having a same number of output transitions as a number of output transitions from the non-deterministic state.

27. The article of manufacture of claim 25, further comprising:

using data structures to indicate states capable of transitioning to multiple states;

updating one state having transitions to multiple states to point to a new state providing deterministic transitions to the multiple states.

28. The article of manufacture of claim 25, wherein defining the table having columns further comprises processing the regular expressions to determine categories of characters that each form one of the columns in the table.

29. The article of manufacture of claim 28, wherein processing the regular expressions comprises forming categories of characters where no subset of the categories intersects any other category of characters.

30. The article of manufacture of claim 25, wherein the new row is a source row and a target cell comprises a target cell in the decision point row in the input column, wherein determining whether one input character would cause transition to multiple states comprises determining whether the target cell is empty, wherein the target cell is set to point to a number of the added new row if the target cell is not empty; and wherein adding additional states comprises executing a merge routine to add additional states to have the state represented by the target cell point to the state represented by the row pointed to by the target cell and the state represented by the source in a deterministic manner.

31. The article of manufacture of claim 30, wherein execution of the merge routine performs;

adding an additional new row to the table if the target cell is not empty; and merging the content of the row pointed to by the target cell and the source row into the additional new row if the target cell is not empty.

32. The article of manufacture of claim 31, wherein merging the content into the added new row further comprises:

copying the content of the row pointed to by the target cell to the additional new row to form a new target row;

copying, for each column, the content of the source row into the column in the new target row if the column in the new target row is empty; and recursively performing the merge routine if one column in the new target row is not empty.

33. The article of manufacture of claim 25, further comprising performing, upon determining that a character following the input character is a repeat character:

indicating duplication of a pre-repeat decision point row pointing to a character before the character that is before the repeat character; and setting a value in the column corresponding to the character before the repeat in the pre-repeat decision point row to point to a row that has a value in the column corresponding to a character following the repeat character and in the column corresponding to the character before the repeat character.

34. The article of manufacture of claim 25, further comprising performing, upon determining that the input character indicates the beginning of an optional expression:

indicating duplication of a pre-optional expression decision point row for a character before a beginning of the optional expression; and setting a value in the column corresponding to the character following the optional expression in the pre-optional expression decision point row to point to a row that has a value in the column corresponding to a character following the optional expression and in the column corresponding to a first character within the optional expression.

35. An article of manufacture for generating a table for use by a computer in determining a location of boundaries in text, the article of manufacture comprising a computer usable medium including at least one computer program that causes the computer to perform:

initializing the table by defining columns in the table;

processing at least one regular expression;

processing input characters in the at least one regular expression to determine at least one transition to at least one state by:
  (i) indicating one row as a decision point;

(ii) receiving an input character;
(iii) adding a new row to the table for the input character; and
(iv) setting an input column corresponding to the input character in at least one decision point row to point to a row number of the added new row;

determining whether one input character would cause a transition to multiple states;

adding additional states to the table to transform the transition to multiple states to a deterministic transition;

determining whether the input character is a special character; and indicating duplicates of the decision point row to allow for multiple sequences of characters from one decision point.

36. An article of manufacture for generating a table for use by a computer in determining a location of boundaries in text, the article of manufacture comprising a computer usable medium including at least one computer program that causes the computer to perform:

initializing the table by defining columns in the table;

processing at least one regular expression;

processing input characters in the at least one regular expression to determine at least one transition to at least one state by:
(i) indicating one row as a decision point;
(ii) receiving an input character;
(iii) adding a new row to the table for the input character; and
(iv) setting an input column corresponding to the input character in at least one decision point row to point to a row number of the added new row;

determining whether one input character would cause a transition to multiple states;

adding additional states to tie table to transform the transition to multiple states to a deterministic transition; and performing, upon determining that the input character indicates the beginning of an alternative expression, indicating duplicates of the decision point row to allow for alternative sequences of characters from one decision point.

* * * * *

UNITED STATES PATENT AND TRADEMARK OFFICE
CERTIFICATE OF CORRECTION

| | | |
|---|---|---|
| PATENT NO. | : 6,742,164 B1 | Page 1 of 1 |
| APPLICATION NO. | : 09/388329 | |
| DATED | : May 25, 2004 | |
| INVENTOR(S) | : Richard Theodore Gillam | |

It is certified that error appears in the above-identified patent and that said Letters Patent is hereby corrected as shown below:

<u>Title page of patent</u>, item 54 and col. 1, line 1, delete title "METHOD, SYSTEM, AND PROGRAM FOR GENERATING A DETERMINISTIC TABLE TO DETERMINE BOUNDARIES BETWEEN CHARACTERS", and insert -- GENERATING A DETERMINISTIC DATA STRUCTURE TO DETERMINE BOUNDARIES BETWEEN CHARACTERS --.

<u>Column 13</u>, line 23, delete "row" and insert -- row; --. After "row", start new paragraph with "determining".

<u>Column 15</u>, line 15, delete "expression" and insert -- expression; --.
   Line 18, delete "state:" and insert -- state by: --.

<u>Column 16</u>, line 32, delete "flat" and insert -- that --.

<u>Column 17</u>, line 43, delete "row" and insert -- row; --.

<u>Column 20</u>, line 14, delete "tie" and insert -- the --.

Signed and Sealed this

Twenty-eighth Day of August, 2007

JON W. DUDAS
*Director of the United States Patent and Trademark Office*